United States Patent
Golfetto

(10) Patent No.: US 11,077,487 B2
(45) Date of Patent: Aug. 3, 2021

(54) METAL FORM CONTAINING DISPERSED AEROGEL PARTICLES IMPREGNATED WITH POLYMERS AND A METHOD OF PRODUCING THE SAME

(71) Applicant: IP METADRY LLC, Farmington Hills, MI (US)

(72) Inventor: Michael Golfetto, Farmington Hills, MI (US)

(73) Assignee: Meta-Dry, LLC, Farmington Hills, MI (US)

(*) Notice: Subject to any disclaimer, the term of this patent is extended or adjusted under 35 U.S.C. 154(b) by 0 days.

(21) Appl. No.: 16/521,358

(22) Filed: Jul. 24, 2019

(65) Prior Publication Data

US 2019/0344333 A1    Nov. 14, 2019

Related U.S. Application Data

(63) Continuation-in-part of application No. 15/966,421, filed on Apr. 30, 2018, which is a continuation-in-part
(Continued)

(51) Int. Cl.
    *B22F 3/00*         (2021.01)
    *B22C 7/02*         (2006.01)
(Continued)

(52) U.S. Cl.
    CPC .............. *B22C 7/026* (2013.01); *B01D 3/00* (2013.01); *B01D 12/00* (2013.01);
(Continued)

(58) Field of Classification Search
None
See application file for complete search history.

(56) References Cited

U.S. PATENT DOCUMENTS 3,025,680 A    3/1962    Brosse et al.
3,113,032 A    12/1963    Wayne
(Continued)

FOREIGN PATENT DOCUMENTS

CN           1490582 A     4/2004
DE    102008022754 A1    11/2009
(Continued)

OTHER PUBLICATIONS

Rosa, Teresa, "Synthesis of Amine-Modified Aerogel Sorbents and Metal-Organic Framework (MOF-5) Membranes for Carbon Dioxide Separation", Dec. 2010, Arizona State University (Year: 2010).*
(Continued)

*Primary Examiner* — Seth Dumbris
(74) *Attorney, Agent, or Firm* — Dickinson Wright PLLC

(57) ABSTRACT

A composite structure including a metal form. The composite structure further includes an aerogel matrix formed of an aerogel, with the aerogel matrix being nanoporous and including a plurality of aerogel pores. A polymer occupies at least a portion of the aerogel pores of the aerogel matrix. The polymer is a thermoplastic. The thermoplastic is nanoporous and includes a plurality of thermoplastic pores. The thermoplastic pores are less than 10 nanometers in size. The polymer is impregnated within the aerogel pores of the aerogel matrix. The aerogel comprises at least 20% by weight of the composite structure. The aerogel pores are less than 10 nanometers in size. The composite structure further contains filler material. The filler material may be graphene. The composite structure further contains reinforcing agents.

15 Claims, 18 Drawing Sheets

Related U.S. Application Data of application No. 15/956,252, filed on Apr. 18, 2018, which is a continuation-in-part of application No. PCT/US2017/030216, filed on Apr. 28, 2017, which is a continuation-in-part of application No. PCT/US2016/059611, filed on Oct. 29, 2016.

(60) Provisional application No. 62/248,194, filed on Oct. 29, 2015, provisional application No. 62/248,162, filed on Oct. 29, 2015.

(51) Int. Cl.

| | |
|---|---|
| *B01D 12/00* | (2006.01) |
| *C01B 33/158* | (2006.01) |
| *B29C 67/20* | (2006.01) |
| *F26B 5/06* | (2006.01) |
| *B01D 3/00* | (2006.01) |
| *B01J 13/00* | (2006.01) |
| *B22D 25/00* | (2006.01) |
| *B29C 35/16* | (2006.01) |
| *C08J 9/22* | (2006.01) |
| *B82Y 30/00* | (2011.01) |

(52) U.S. Cl.
CPC ....... *B01J 13/0065* (2013.01); *B01J 13/0091* (2013.01); *B22D 25/005* (2013.01); *B29C 35/16* (2013.01); *B29C 67/202* (2013.01); *B29C 67/207* (2013.01); *C01B 33/1585* (2013.01); *C08J 9/22* (2013.01); *F26B 5/06* (2013.01); *B82Y 30/00* (2013.01); *C08J 2205/026* (2013.01); *Y02P 20/54* (2015.11); *Y10T 428/12014* (2015.01); *Y10T 428/12049* (2015.01)

(56) References Cited

U.S. PATENT DOCUMENTS

| | | |
|---|---|---|
| 5,156,895 A | 10/1992 | Martin |
| 5,190,987 A | 3/1993 | Parkinson |
| 5,275,796 A | 1/1994 | Tillotson et al. |
| 5,443,746 A | 8/1995 | Harris et al. |
| 5,851,947 A | 12/1998 | Hair et al. |
| 6,080,219 A * | 6/2000 | Jha .......................... B22F 3/114 55/486 |
| 6,417,293 B1 * | 7/2002 | Chorvath ............. C08K 5/0091 524/292 |
| 6,627,669 B2 | 9/2003 | Mukherjee et al. |
| 6,704,192 B2 | 3/2004 | Pekala |
| 6,887,563 B2 | 5/2005 | Frank et al. |
| 7,071,287 B2 | 7/2006 | Rhine et al. |
| 7,074,880 B2 | 7/2006 | Rhine et al. |
| 7,078,359 B2 | 7/2006 | Stepanian et al. |
| 7,258,873 B2 | 8/2007 | Truong-Le et al. |
| 7,560,062 B2 | 7/2009 | Gould et al. |
| 9,136,536 B2 | 9/2015 | Grigorian et al. |
| 9,260,581 B2 | 2/2016 | Leventis et al. |
| 9,276,190 B2 | 3/2016 | Pen |
| 9,381,471 B2 | 7/2016 | Pénicaud |
| 9,449,723 B2 | 9/2016 | Park et al. |
| 9,522,358 B2 | 12/2016 | Zhang et al. |
| 9,593,225 B2 | 3/2017 | Leventis et al. |
| 2007/0037903 A1 * | 2/2007 | Swift .................. C08J 5/005 523/218 |
| 2008/0287561 A1 | 11/2008 | Menashi et al. |
| 2008/0311398 A1 | 12/2008 | Bauer et al. |
| 2009/0226700 A1 | 9/2009 | Ratke et al. |
| 2011/0250428 A1 | 10/2011 | Leventis et al. |
| 2012/0134909 A1 | 5/2012 | Leventis et al. |
| 2012/0175012 A1 | 7/2012 | Goodwin et al. |
| 2013/0022769 A1 | 1/2013 | Sabri et al. |
| 2014/0030590 A1 | 1/2014 | Wang et al. |
| 2014/0128488 A1 | 5/2014 | Lotti et al. |
| 2014/0350134 A1 | 11/2014 | Rodman et al. |
| 2015/0141533 A1 | 5/2015 | Joshi et al. |
| 2016/0223269 A1 | 8/2016 | Hartmann et al. |
| 2016/0280876 A1 | 9/2016 | Strey et al. |
| 2016/0280877 A1 | 9/2016 | Kim et al. |
| 2017/0050990 A1 | 2/2017 | Leventis et al. |
| 2017/0096548 A1 | 4/2017 | Kim et al. |
| 2018/0043656 A1 | 2/2018 | Song et al. |

FOREIGN PATENT DOCUMENTS

| | | |
|---|---|---|
| EP | 0254778 A1 | 2/1988 |
| EP | 1306148 B1 | 9/2006 |
| EP | 1952908 B1 | 1/2013 |
| WO | 2015065557 A1 | 5/2015 |
| WO | 2016127084 A1 | 8/2016 |
| WO | 2016161123 A1 | 10/2016 |
| WO | 2017087511 A1 | 5/2017 |

OTHER PUBLICATIONS

Kang et al, Nanotube Aerogel Sheet Flutter for Actuation, Power Generation, and Infrasound Detection, Nature, Aug. 18, 2014, available at: https://www.nature.com/articles/srep06105.

* cited by examiner

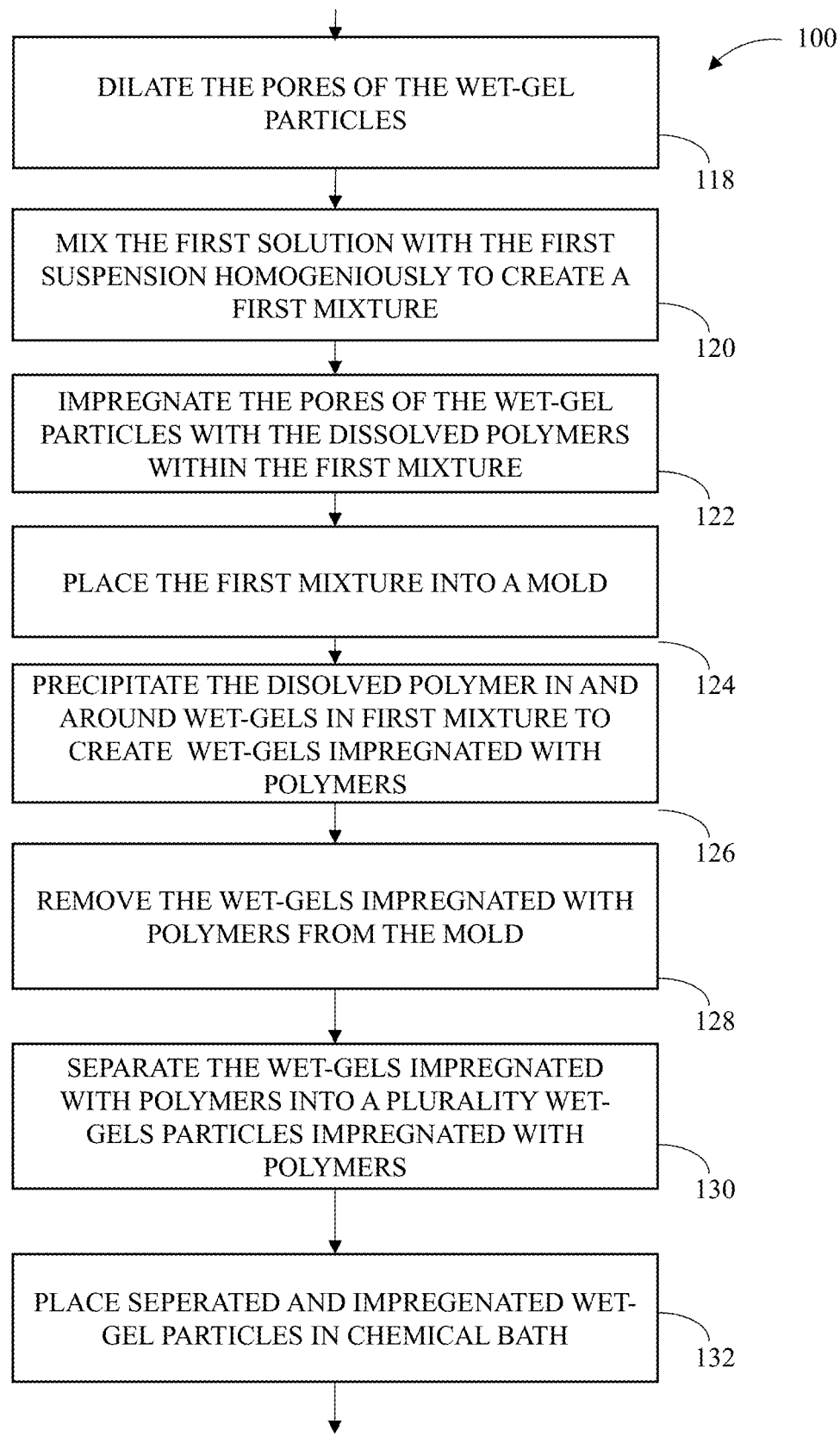
FIG. 1b     CONTINUED IN FIG. 1c

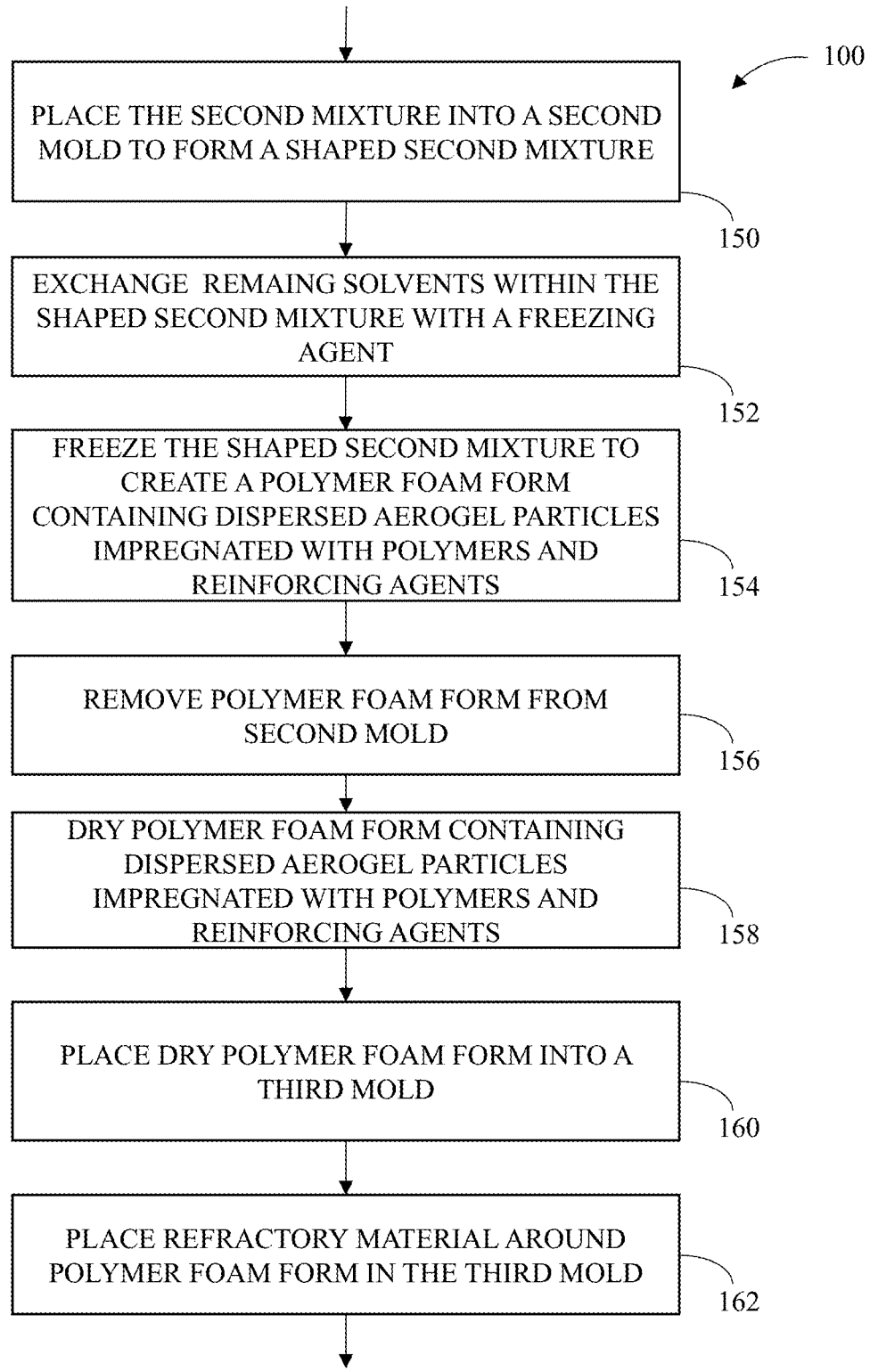
FIG. 1d   CONTINUED IN FIG. 1e

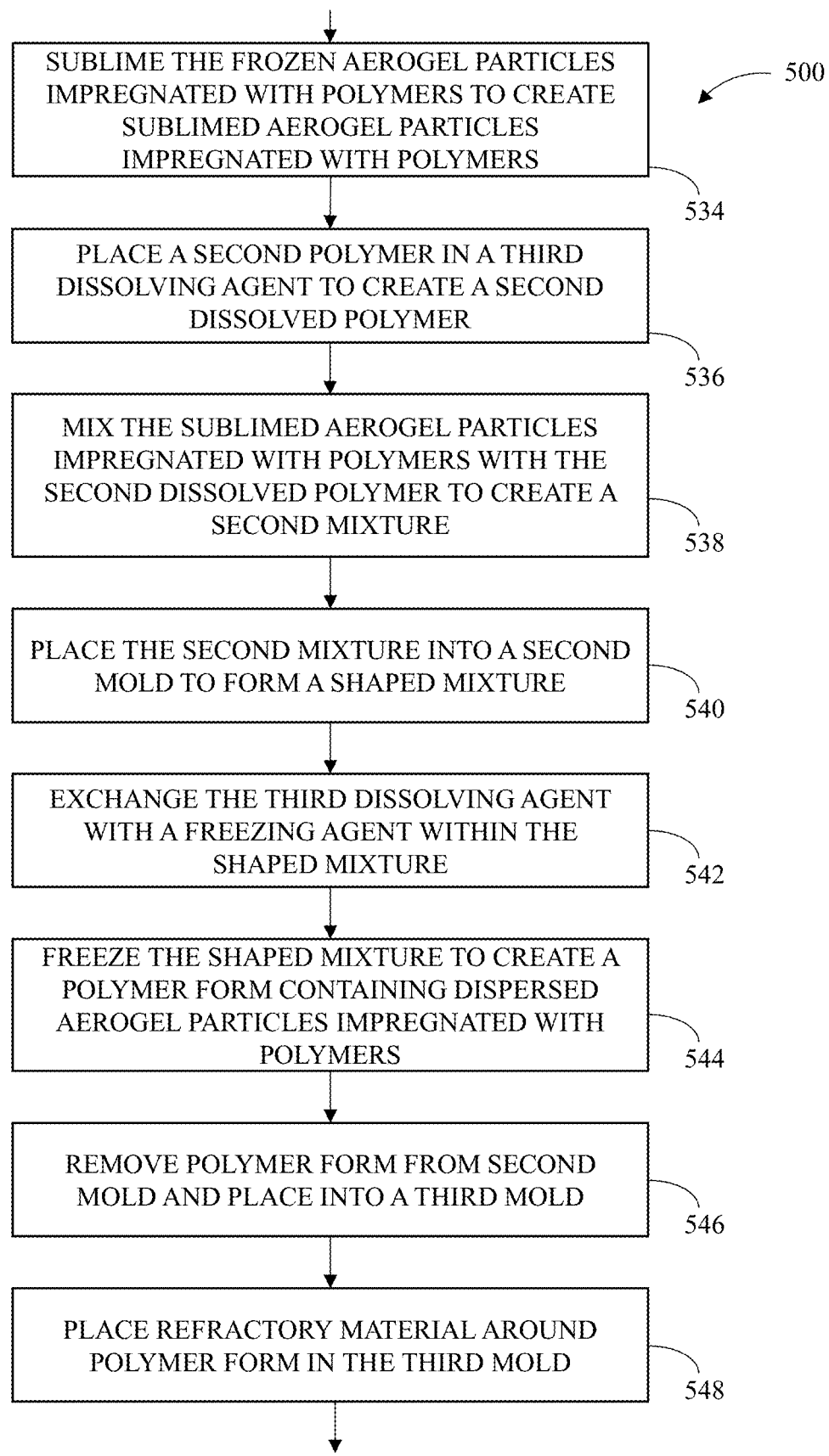
FIG. 5c        CONTINUED IN FIG. 5d

METAL FORM CONTAINING DISPERSED AEROGEL PARTICLES IMPREGNATED WITH POLYMERS AND A METHOD OF PRODUCING THE SAME

CROSS-REFERENCE TO RELATED APPLICATIONS

This application is a continuation in part of U.S. patent application Ser. No. 15/966,421, filed on Apr. 30, 2018, which is a continuation in part of U.S. patent application Ser. No. 15/956,252, filed on Apr. 18, 2018, which is a continuation in part of International Application No. PCT/US2017/030216, filed on Apr. 28, 2017 which is a continuation in part of International Application No. PCT/US2016/059611, filed on Oct. 29, 2016, which claims the benefit of U.S. Provisional Application No. 62/248,162, filed on Oct. 29, 2015, and U.S. Provisional Application No. 62/248,194, filed on Oct. 29, 2015. The entire disclosures of each of the above applications are incorporated herein by reference.

FIELD

A metal form containing dispersed aerogel particles impregnated with polymers and a method of producing the same.

BACKGROUND

An aerogel is a synthetic material that is porous and lightweight. Aerogels are derived from a gel where the liquid component of the gel has been replaced with a gas. A variety of chemical compounds can be used to make aerogel by extracting the liquid component of the gel using supercritical drying, which allows the liquid to be slowly dried away without causing the solid matrix of the gel to collapse from capillary action. Gels of different compositions may be synthesized through a number of known methods, which may include a sol-gel process. The sol-gel process involves the production of sol, or colloidal suspension of very small solid particles in a continuous liquid medium, where nanostructures form the solid particles dispersed in the liquid medium. The sol-gel process also involves causing the nanostructures in the sol to interconnect to form a 3D network, forming a gel. As provided herein, a gel may be a wet solid-like material in which a solid network of interconnected nanostructures spans the volume of a liquid medium. The continuous phase is a solid network and the dispersed phase is a liquid. Generally speaking, the term wet-gel and sol-gel can refer to aerogel materials having pores that are substantially filled with liquid particles. As provided herein, aerogels can be dry, nanoporous, nanostructured materials containing both mesopores and micropores. In nanoporous materials, pores are less than 100 nm. Nanoporous materials can be divided up into microporous materials, with pore diameters of less than 2 nm; mesoporous materials, with pore diameters between 2 nm and 50 nm; and macroporous materials, with pore diameters between 50 nm and 100 nm. As provided her in, aerogel particles may be considered matrices of dry materials comprising at least a 50% void space by volume in which the solid-phase component comprises a 3D nanostructured solid network. Thus aerogels do not have a designated material or chemical formula, but represent a group of materials with a certain geometric structure. A thermosetting plastic (thermoset) is a plastic that is irreversibly cured from a soft solid or viscous liquid, prepolymer or resin. The process of curing changes the resin into an infusible, insoluble polymer network, and is induced by the action of heat or suitable radiation often under high pressure, or by mixing with a catalyst. A thermosoftening plastic (thermoplastic) is a plastic material that becomes pliable or moldable above a specific temperature and solidifies upon cooling. Plastics are made up of polymers, which can be classified as crystalline; having periodic 3D repeating arrays of molecules; amorphous, having no repeating arrays of molecules; and semi-crystalline, having regions of both crystalline and amorphous molecular arrangements.

SUMMARY

One aspect of the disclosure provides for a composite structure including a metal form. The metal form includes an aerogel matrix formed of an aerogel, wherein the aerogel matrix is nanoporous and includes a plurality of aerogel pores.

Another aspect of the disclosure provides for a composite structure including an aerogel matrix formed of an aerogel, wherein the aerogel matrix is nanoporous and includes a plurality of aerogel pores dispersed throughout the aerogel matrix. A polymer occupies at least a portion of the aerogel pores.

A method of producing a composite structure of aerogel and thermoplastic. The method includes forming a first mixture including a polymer, a suspension of gel particles, and at least one solvent. The method further includes solidifying the first mixture to form a solidified mixture. The method further includes drying the solidified mixture to remove the remaining solvent.

BRIEF DESCRIPTION OF THE DRAWINGS

Other advantages of the present disclosure will be readily appreciated, as the same becomes better understood by reference to the following detailed description when considered in connection with the accompanying drawings wherein:

FIG. 1b is the continued flow chart from FIG. 1a showing the method of producing the metal form containing dispersed aerogel particles impregnated with polymers;

FIG. 1d is the continued flow chart from FIG. 1c showing the method of producing the metal form containing dispersed aerogel particles impregnated with polymers;

FIG. 5c is the continued flow chart from FIG. 5b showing another embodiment of the method of producing the metal form containing dispersed aerogel particles impregnated with polymers;

FIG. 10b is a magnified view of a portion of the composite of FIG. 10a; and

DESCRIPTION OF THE ENABLING EMBODIMENT

Figure 1A:
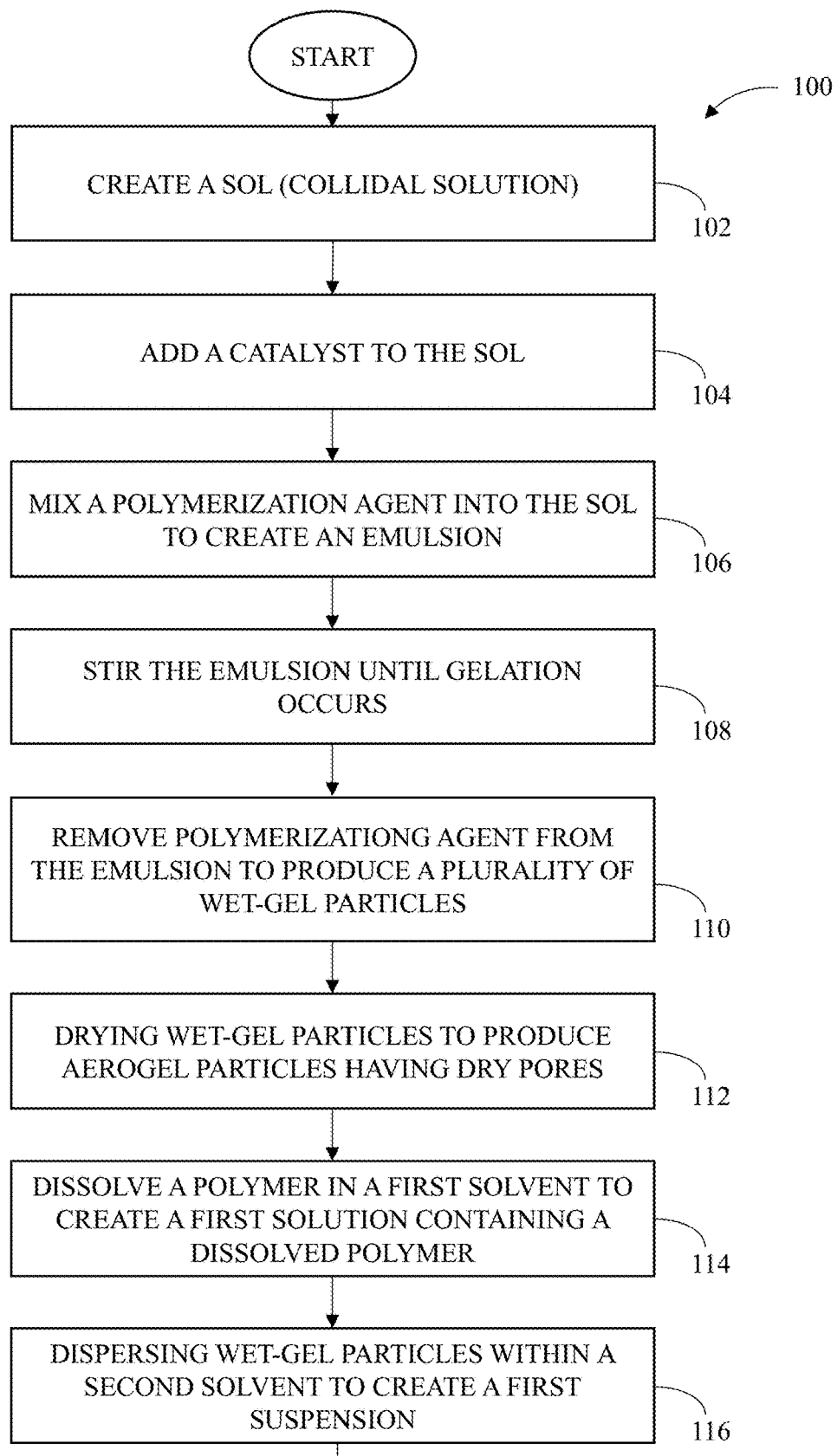
FIG. 1a is a flow chart showing a method of producing a metal form containing dispersed aerogel particles impregnated with polymers.
Figure 1C:
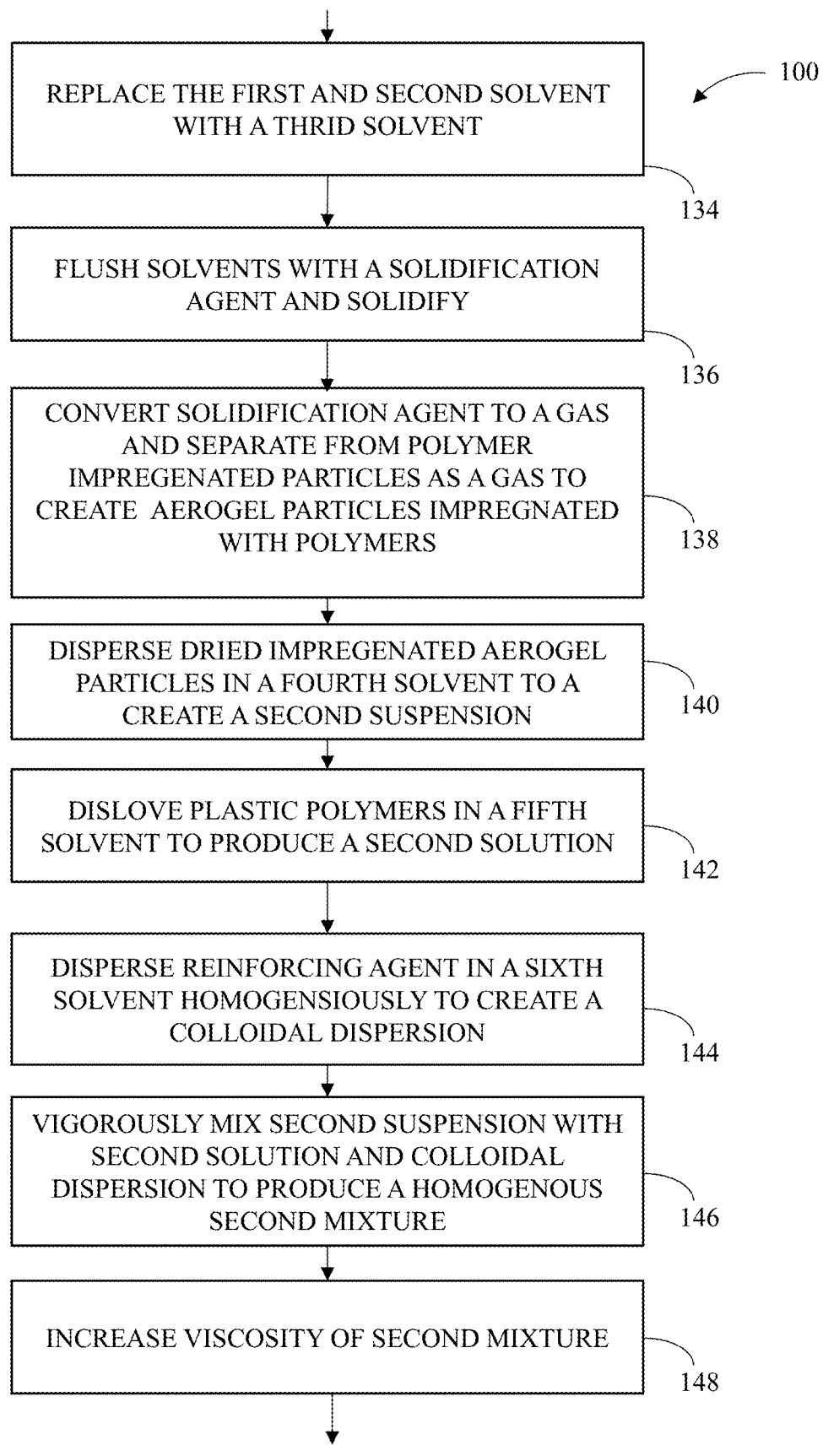
FIG. 1c is the continued flow chart from FIG. 1b showing the method of producing the metal form containing dispersed aerogel particles impregnated with polymers.
Figure 1E:
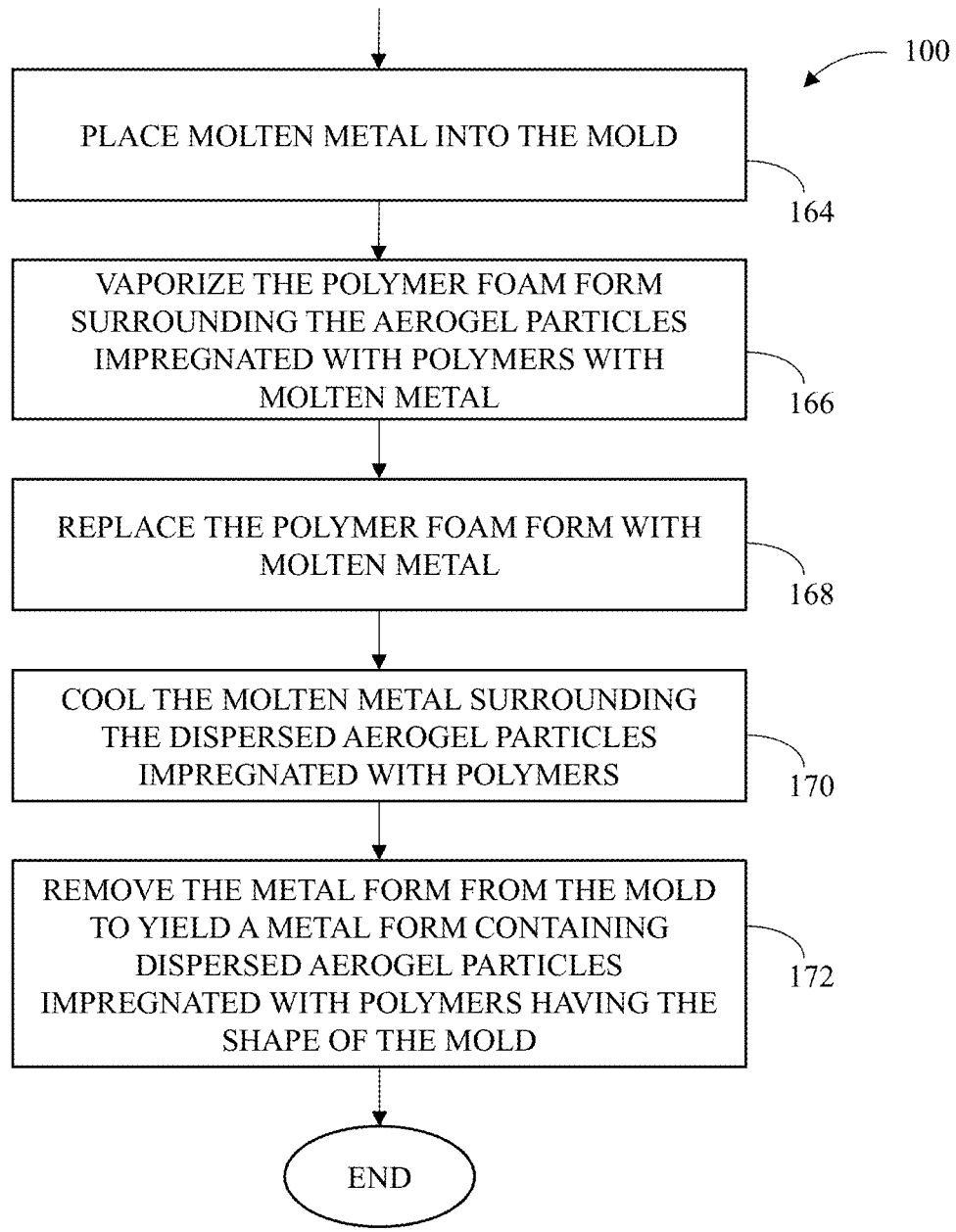
FIG. 1e is the continued flow chart from FIG. 1d showing the method of producing the metal form containing dispersed aerogel particles impregnated with polymers.

The following methods describe a method of producing a metal form containing dispersed aerogel particles, a method of producing an aerogel impregnated with polymers, and a method of producing a metal form containing dispersed aerogel particles.

Method 100, shown in FIGS. 1a, 1b, 1c, 1d, and 1e, illustrates a method of producing a metal form containing dispersed aerogel particles impregnated with polymers which begins at step 102 with creating a colloidal solution herein referred to as a sol. The sol starts the process of creating sol-gel particles. The sol is comprised of a plurality of sol-gel precursors and at least one solvent. The sol-gel precursors may be any organic or inorganic material known in the art, such as, silica, metal and metalloid oxides, metal chalcogenides, metals, metalloids, amorphous carbon, graphitic carbon, diamond, discrete nanoscale objects, organic polymers, biopolymers, polyurea, a polyurethane, a polyisocyanate, a polyisocyanurate, a polyimide, a polyamide, a polybenzoxazine, a polyacrylonitrile, a polyetheretherketone, a polyetherketoneketone, a polybenzoxazole, a phenolic polymer, a resorcinol-formaldehyde polymer, a melamine-formaldehyde polymer, a resorcinol-melamine-formaldehyde polymer, a furfural-formaldehyde polymer, an acetic-acid-based polymer, a polymer-crosslinked oxide, a silica-polysaccharide polymer, a silica-pectin polymer, a polysaccharide, amorphous carbon, graphitic carbon, graphene, diamond, boron nitride, an alginate, a chitin, a chitosan, a pectin, a gelatin, a gelan, a gum, a cellulose, a virus, a biopolymer, an ormosil, an organic-inorganic hybrid material, a rubber, a polybutadiene, a poly(methyl pentene), a polypentene, a polybutene, a polyethylene, a polypropylene, a carbon nanotube, a boron nitride nanotube, graphene, two-dimensional boron nitride, and combinations thereof as non-limiting examples. In some embodiments, suitable matrix materials may be reinforced with a fiber, a fibrous batting, aligned fibers, chopped fibers, or another suitable material. In some of these embodiments, the fiber comprises silica, glass, carbon, a polymer, poly(acrylonitrile), oxidized poly(acrylonitrile), poly(p-phenylene-2,6-benzobisoxazole) (e.g., ZYLON® polyoxazole manufactured by Toyobo Corp. (Japan)), poly(paraphenylene terephthalamide) (e.g., KEVLAR® para-aramid manufactured by DuPont (Wilmington, Del.)), ultrahigh molecular weight polyethylene (e.g., SPECTRA® ultrahigh molecular weight polyethylene manufactured by Honeywell (Morris Plains, N.J.) or DYNEEMA® ultrahigh molecular weight polyethylene manufactured by Royal DSM (Netherlands)), poly(hydroquinone diimidazopyridine) (e.g., M5), polyamide (e.g., NYLON®), natural cellulose, synthetic cellulose, silk, viscose (e.g., rayon), a biologically-derived fiber, a biologically-inspired fiber, a ceramic, alumina, silica, zirconia, yttria-stabilized zirconia, hafnia, boron, metal/metalloid carbide (e.g., silicon carbide), metal/metalloid nitride (e.g., boron nitride), nanotubes, carbon nanotubes, carbon nanofibers, boron nitride nanotubes, oxide nanotubes as non-limiting examples. Metalloids include boron, silicon, germanium, arsenic, antimony, tellurium, polonium and combinations thereof as non-limiting examples. Metals include lithium, sodium, potassium, rubidium, cesium, francium, beryllium, magnesium, calcium, strontium, barium, radium, aluminum, scandium, titanium, vanadium, chromium, manganese, iron, cobalt, nickel, copper, zinc, gallium, yttrium, zirconium, niobium, molybdenum, technetium, ruthenium, rhodium, palladium, silver, cadmium, indium, tin, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, thallium, lead, bismuth, actinium, thorium, protactinium, uranium, neptunium, plutonium, americium, curium, berkelium, californium, einsteinium, fermium, mendelevium, nobelium, lawrencium, the transactinide metals and combinations thereof as non-limiting examples. Discrete nanoscale objects include carbon nanotubes, boron nitride nanotubes, viruses, semiconducting quantum dots, graphene, and combinations thereof as non-limiting examples.

The solvent may be selected from the following: 2-methoxyethanol, 2,6,10,14-tetramethyl pentadecane acetic acid, acetone, acetonitrile, acrolein, alcohols, acetic acid, amyl alcohol, amyl acetate, aniline, aliphatic halogenated hydrocarbons, benzene, 1-butanol, 2-butanol, 2-butanone, t-butyl alcohol, N-butyraldehyde, N-butanol, N-butanol, sec-butanol, ie/t-butanol, carbon tetrachloride, cholrobenzene, cholroform, chlorex, cresylic acid, cyclohexanol, C1-C6 alcohols, cyclohexanone, cyclo-cresylic acid, cycloaliphatic halogenated hydrocarbons, decane, decanes, dimethylsulfoxide, Dimethylacetamide, dimethylformamide, N,N'-dimethylformamide, 1,4-dioxane, epoxides, ethanol, ethyl acetate, ethylene glycol, fluorinated ethers, furfural, furfural alcohol, glycerin, glycols, heptane, Hexamethylphosphoramide, Hexamethylphosphorous triamide, hexane, hexanes, N-hexane, hydrocarbons, isopropanol, isopropanol, liquid hydrocarbons, liquid SO2, methanol, methoxy ethanol, methylene chloride, Methyl-ethyl Ketone, methyl t-butyl ether N-methyl-2-pyrrolidinone, nitromethane, nitrobenzene, pentane, pentanol, petroleum ether, 1-propanol, 2-propanol, ft-propanol, polyols, pyridine, quinolone, tert-butyl alcohol, tetrahydrofuran, toluene, triethyl amine water, o-xylene, m-xylene, p-xylene. Upon the addition of sol-gel precursors to at least one of the aforementioned solvents together, the combination is vigorously agitated until the a homogenous sol is created. Once the sol is created, the process moves to Step 104.

Step 104 consists of stirring a catalyst into the sol in order to accelerate the formation of solid nanoparticle networks containing a liquid. The catalyst activates one or more of the solvents within the sol to create solid cohesive network of nanoparticles suspended in the sol. The catalyst may be selected from a group comprising of primary amines, secondary amines, tertiary amines, isocyanates, diisocyanates, triisocynates, epoxide, thiol, triazine derivatives, organometallic compounds, metal chelates, quaternary ammonium salts, ammonium hydroxides, alkali metals, alkaline earth metal hydroxides, alkoxides, and carboxylates. Once the catalyst is added and stirred into the sol then method 100 moves to step 106.

During step 106, a polymerization agent is added to the sol in order to create an emulsion. An emulsion, as used herein, is defined as a mixture contained more than one liquid. The polymerization agent may be any one of the aforementioned solvents used in step 102, as well as other compounds such as liquid monomers or polymers with moieties having functional groups comprised of the following: Alkyl, Alkenyl, Alkyynyl, Phenyl, Halo. Fluro, Chloro, Bromo, Iodo, Hydroxyl, carbonyl, Aldehyde, Haloformyl, Carbonate ester, Carboxylate, Carboxyl, Ester, Methoxy, Hydroperoxy, Peroxy, Ether, Hemiacetal, Hemiketal, Acetal, Ketal, Orthoester, Methylenedioxy, Orthocarbonate ester, Carboxamide, Amines, Imines, Imide Azide, Azo, Cyanate, Isocyanate, Nitrate, Isonitrile, Nitrosooxy, Nitro, Nitrose, Oxime, Pyridyl, Sulfhydryl, Sulfide, Disulfide, Sulfinyl, Sulfonyl, Sulfino, Sulfo, Thiocyanate, Isothiocyanate, Carbonothioyl, Carbonothioyl, Phosphino, Phosphono, Phosphate, Borono, Boronate, Borino, Borinate or radical moieties containing single, double, triple bonds or carboxylic acyl radical. The polymerization agent may act as a means of crosslinking the sol's networks. The polymerization agent can also be and additional catalysts from steps 106. The polymerization agent may be a co-solvent that adjusts the ph of the sol's colloidal solution. The polymerization agent may also serve as a means for aggregation of particles having an affinity for polar or nonpolar solvents. The polymerization agent can act to influence the nature of the sol's nanoparticle network formation at liquid-liquid or liquid-air interfaces, such as orienting the formation of the solid network through the formation of micelles. Once the emulsion is created, the method 100 continues to step 108.

During step 108, the emulsion is stirred until gelation occurs. Gelation, as used herein, is defined as the formation of macroscopic gel networks. The emulsion may be subjected to low temperatures to promote gelation or gelation may occur through chemical reactions taking place within the sol. Once gelation occurs, wet-gel particles are said to be formed and the method 100 continues to step 110.

During step 110, a polymerization agent can be removed from the wet-gel particles by means such as blotting, centrifuging, crosslinking, decanting, draining, evaporating, filtering, polymerizing, precipitating, scraping, rinsing, rubbing or washing. Removing the polymerization agent creates wet-gel particles which contain nanopores. Once the polymerization agent is removed, the method 100 continues to step 112.

During step 112, the wet-gel particles are dried through ambient pressure drying, evaporation, lyophilization and or supercritical drying. Once drying is finished, the remaining particles will be dried aerogel particles and the method 100 can continue to step 114.

During step 114, a polymer is placed within a first solvent that can dissolve a preponderance the polymer creating a first solution. The polymer can be a natural polymer or synthetic polymer comprised of a plurality of molecular units. Some preferred polymers may be one of cellulose, branched, unbranched, crystalline, semicrystaline, amorphous, polyester, polyethylene, terephthalate, polyolefin, polyacrylic acid, polymethylacrylate, expoxy, polymethyl methacrylate, acrylonitrile butadiene styrene, polyimides, polyamides, polycaprolactam, polylactic acid, polybenzimidazole, polycarbonate, polyether sulfone, polyetherether ketone, polyetherimide, polyethylene, medium-density polyethylene, low-density polyethylene, polyphenylene oxide, polyphenylene sulfide, polypropylene, polystyrene, polyvinyl chloride, and polytetrafluoroethylene, or others not listed here. The first dissolving agent may be any of the solvents list as suitable for step 102. Once the first solution is created, the method 100 moves to step 116.

During step 116, wet-gel particles from step 110 or dried aerogel particles from step 112 are dispersed in a second solvent to form a uniform dispersion of wet-gel particles in a second solvent herein referred to as the first suspension. After the first suspension is formed the method 100 proceeds to step 118.

During step 118, the pores of the wet-gel particles are dilated within the first suspension, within the first mixture. The process of dilating the pores of the aerogel particles may be completed in a number of ways such as solvent induced swelling or by increasing the temperature or the pressure of the wet-gel particles. In this method, the wet-gel particles may be placed within a pressure chamber so that the aerogel particles are subjected to high temperature and increased pressure in order to dilate the pores of the aerogel particles. Once the pores of the aerogel particles are dilated, the method 100 moves to step 120.

During step 120, the wet-gel particles having dilated pores in the first suspension are mixed vigorously with the dissolved polymers in the first solution and agitated until a homogenous mixture forms herein referred to as the first mixture. One the first mixture is formed the method 100 can proceed to step 122.

During step 122, the wet-gel particles in the first mixture are infiltrated with the dissolved polymers within the first mixture, thus creating wet-gel particles infiltrated with polymers. This step may take place within a pressure vessel where the temperature and pressure within the vessel is increased in order to allow the polymers to enter the pores of the wet-gel particles, thereby infiltrating the wet-gel particles with polymers. Once the infiltration step is completed then the method 100 continues to step 124.

During step 124, the first mixture containing the wet-gel particles infiltrated with polymers is placed into a first mold. The mold may be of any shape or design suitable for the entire contents of the first mixture. The method 100 continues to step 126.

During step 126, the dissolved polymer in and around the pores of the wet-gel particles is precipitated to form wet-gel particles impregnated with polymers. Precipitation may be induced through evaporation, sedimentation, depressurization, concentration, filtering, distillation or by first mixture is subjected to low temperatures to induce freezing. The temperature may be variable depending on the solvents and polymers used within the first mixture. Freezing the first mixture creates a solid form comprising wet-gel impregnated with polymers. This step may be completed within a pressure chamber by lowering the temperature within the pressure chamber in order to freeze the first mixture. Once the aerogel impregnated with polymers is frozen solid then the method 100 continues to step 128.

During step 128, the wet-gels impregnated with polymers is removed from the first mold. The wet-gel particles impregnated with polymers may optionally be mixed with filler material. The filler material may comprise graphene, graphene oxide, carbon nanotubes, cellulose nanocrystals as well as other two and three dimensional materials. Once removed from the mold, the method 100 may proceed to step 130.

In step 130, the wet-gels removed from the mold in steps 128 can be separated into many wet-gel particles impregnated with polymers. Once separated, the method 100 may proceed to step 132.

In step 132, the wet-gel particles impregnated with polymers are placed into a chemical bath. The chemical bath works as a cleaning agent and the chemicals used may be selected from one or more the aforementioned solvents listed as being suitable for steps 102. Once the wet-gel particles impregnated with polymers are placed in the chemical bath, the method 100 continues to step 134.

During step 134, the first and second solvent dispersed throughout the wet-gel particles impregnated with polymers are replaced with a third solvent. The process of replacing may be completed through solvent exchange which allows the third solvent to replace a different solvent. The step of replacing the first and second solvents with a third solvent may be completed within a pressure chamber. This may be conducted by flushing the pressure chamber, while the wet-gel particles impregnated with polymers are within the pressure chamber, with the third solvent in order to remove a preponderance of the first and second solvents and leave a preponderance of the third solvent within the wet-gel particles, thereby exchanging the first and second solvents with the third solvent. The third solvent may be selected from one or more the aforementioned solvents listed as being suitable for steps 102. Once solvent exchanged is complete, the method 100 continues to step 136.

Then during step 136, the third solvent is replaced with a solidification agent through another solvent exchange process because the freezing agent and third solvent are partially miscible with one another. By replacing the third solvent with a solidification agent, the wet-gel particles impregnated with polymers in the solidification agent are solidified, creating a solid sol-gel particle network impregnated with polymers. The freezing agent may be selected from liquid carbon dioxide, supercritical carbon dioxide, nitrous oxide, and supercritical dihydrogen monoxide. The solidification agent might also allow for the surface tension of any remaining first, second, or third solvent to be reduced; thus, allowing for solid aerogel particles to be produced through ambient pressure drying. In these instances, the solidification agent is said to have a polar or nonpolar charge similar to the surface of the wet-gel particle network, thus making the wet-gel particle more rigid or solid through mutual repulsive forces. Once the wet-gel particles impregnated with polymers in the solidification agent are solidified, the method 100 continues to step 138.

During step 138, the solidified agent is separated from the wet-gel particles by converting the solidification agent to a gas and separating the gas from the wet-gel particles impregnated with polymers. This creates dried aerogel particles impregnated with polymers and ends step 138, thus moving method 100 to step 140.

During step 140, the dried aerogel particles impregnated with polymers are dispersed with a fourth solvent to generate a second suspension. The fourth solvent may be selected from one or more the aforementioned solvents listed as being suitable for steps 102. After the second suspension is formed the method 100 continues to step 142.

During step 142 a second polymer is placed in a fifth solvent in order to create a second solution. The second polymer may be selected from one of described herein, the polymer can be a natural polymer or synthetic polymer comprised of a plurality of molecular units. Some preferred polymers may be one of cellulose, branched, unbranched, crystalline, semicrystaline, amorphous, polyester, polyethylene, terephthalate, polyolefin, polyacrylic acid, polymethylacrylate, expoxy, polymethyl methacrylate, acrylonitrile butadiene styrene, polyimides, polyamides, polycaprolactam, polylactic acid, polybenzimidazole, polycarbonate, polyether sulfone, polyetherether ketone, polyetherimide, polyethylene, medium-density polyethylene, low-density polyethylene, polyphenylene oxide, polyphenylene sulfide, polypropylene, polystyrene, polyvinyl chloride, and polytetrafluoroethylene, or others not listed here, co-polymers thereof, and combinations therefore of. The fifth solvent may be selected from one or more the aforementioned solvents listed as being suitable for steps 102. After the second solution is formed, step 142 ends and the method 100 continues to step 144.

During step 144, a sixth solvent may be selected from one or more the aforementioned solvents listed as being suitable for steps 102 and mixed with at least one reinforcing agent to form a uniform first colloidal dispersion of reinforcing agent within the sixth solvent. The reinforcing agent in the colloidal dispersion may include: fibers, particles, matrices, foam, mesh crosslinking polymers, two-dimensional materials, few-layer materials often called two-dimensional materials, or nanotubes and can be composed of an aerogel, a zeolite, carbon, a polymer, a glass, crystals, bimetallic glasses, a metal, inorganic elements, functional moieties, or a combination thereof. After the first colloidal dispersion is formed, the method 100 can proceed to step 146.

In step 146, the second solution is added to the second suspension and first colloidal dispersion, and vigorously agitated to form a second mixture. After the formation of the second mixture, the method 100 can proceed to step 148.

In step 148, the viscosity of the second mixture is increased. The viscosity may be increased as a result of at least a portion the fourth, fifth, and or sixth solvent being removed. The viscosity of the second mixture may further increase as a result of change in temperature or pressure of the second mixture; or through crosslinking and or polymerization. The viscosity of the second mixture may also increase due to the solidification of the dissolved polymer in the second mixture. After the viscosity of the second mixture is increased, the method 100 can proceed to step 150.

In step 150, the second mixture is placed into a second mold in order to form a shaped mixture. After step 150 is complete, the method 100 can proceed to step 152.

In step 152, the fourth, fifth, and six solvents in the second mixture are exchanged with a freezing agent. The freezing agent may be selected from one of liquid carbon dioxide, supercritical carbon dioxide, nitrous oxide, and supercritical dihydrogen monoxide. The process of exchanging may take place within a pressure vessel. This may be completed by flushing the pressure vessel with a freezing agent, thereby replacing a preponderance of the solvents in the second mixture with the freezing agent. Once step 152 is complete, the method 100 continues to step 154.

During step 154, the shaped second mixture is frozen creating a polymer foam form containing dispersed aerogel particles impregnated with polymers and a reinforcing agent. The aerogel particles impregnated with polymers were dispersed throughout the shaped mixture and surrounded the second dissolved polymer. When then shaped mixture is frozen the second dissolved polymer freezes and surrounds the dispersed aerogel particles impregnated with polymers and dispersed reinforcing agents, creating a polymer foam form containing dispersed aerogel particles impregnated with polymers and dispersed reinforcing agents. Freezing the dissolved polymer of step 152 can also generate nanoporous structure in the now solid polymer from the second solution. The nanoporous polymer creates a polymer foam form. Once the polymer foam form containing dispersed aerogel particles impregnated with polymers and dispersed reinforcing agents is frozen the method 100 continues to step 156.

During step 156, the polymer foam form containing dispersed aerogel particles impregnated with polymers and dispersed reinforcing agents is removed from the second mold. After step 156 is finished, the method 100 can proceed to step 158.

In step 158, polymer foam form from step 156 can be dried. Drying of frozen polymer foam form containing dispersed aerogel particles impregnated with polymers and dispersed reinforcing agents can be accomplished by converting and remaining solid solvents and or freezing agents, which would otherwise be liquid at about room temperature; to a gas whereby the gas or gaseous mixtures can be separated from the polymer foam form. Thus, result of completing step 158 is a dried polymer foam form containing dispersed aerogel particles impregnated with polymers and dispersed reinforcing agents; which when achieved allows for the method of 100 to proceed to step 160.

In step 160, the dried polymer foam form containing dispersed aerogel particles impregnated with polymers and dispersed reinforcing agents is placed into a third mold with the desired shape of the final product. The third mold may be the same shape as the second mold or the third mold may be larger than the second mold. After placing dried polymer foam form containing dispersed aerogel particles impregnated with polymers and dispersed reinforcing agents into the third mold, the method of 100 can proceed to step 162.

During step 162, a refractory material is placed around the dried polymer foam form containing dispersed aerogel particles impregnated with polymers and dispersed reinforcing agents. After the refractory material is placed around the polymer foam form, the method 100 continues to step 164.

During step 164, molten metal is placed into the third mold. The metal used may be a molten form of one or more of boron, silicon, germanium, antimony, lithium, sodium, potassium, rubidium, cesium, beryllium, magnesium, calcium, strontium, aluminum, titanium, manganese, iron, cobalt, nickel, copper, zinc, gallium, zirconium, molybdenum, silver, cadmium, indium, tin, neodymium, samarium, europium, gadolinium, terbium, dysprosium, holmium, erbium, thulium, ytterbium, lutetium, hafnium, tantalum, tungsten, platinum, gold, mercury, lead, bismuth, and transactinide metals. Once the molten metal is placed in the third mold, the method 100 continues to step 166.

During step 166, the molten metal begins to vaporize the polymer foam form without substantially damaging the aerogel particles impregnated with polymers. In some instances, the molten metal will not damage the reinforcing agents substantially; in other instances, the reinforcing agents can be vaporized along with the polymer foam. In other instances, the molten metal or chemical species resulting from the vaporized polymers, or a combination there for of may cause chemical reactions with at least a portion of the aerogel particles or the reinforcing agents or a combination therefore of. The aerogel particles dispersed throughout the polymer form remain in place while the molten metal vaporizes the polymer form. After the molten metal vaporizes the polymer foam form, the method 100 can proceed to step 168.

During step 168, the molten metal replaces the polymer form after the polymer form is vaporized. The molten metal takes the place of the polymer form and the dispersed aerogel particles continue to remain in the desired location. In some instances, the dispersed reinforcing agents also remain in their desired location. Once the polymer form is replaced with molten metal, a metal form containing dispersed aerogel particles impregnated with polymers is created and the method 100 can proceed to step 170.

The method 100 continues to step 170 where the metal form is cooled so that the metal may harden and form a solid metal form. After step 170 is complete the method 100 proceeds to step 172.

During step 172, the metal form is removed from the third mold which yields a metal form containing dispersed aerogel particles impregnated with polymers having the shape of the third mold. In some instances the resulting metal form can contain dispersed aerogel particles impregnated with polymers and dispersed reinforcing agents. The process of cooling the molten metal form may be completed within a pressure vessel by lowering the temperature within the pressure vessel. In other instances step 144 can be skipped and steps 146 can instead be performed by mixing only the second solution and the second suspension. In instances when step 144 is skipped and omitted from step 146, the resulting second mixture of step 146 will proceed through steps 148-172 creating the desired result of the metal form containing dispersed aerogel particles impregnated with polymers. This ends the method 100 by creating the desired result of the metal form containing dispersed aerogel particles impregnated with polymers.

Figure 2A:
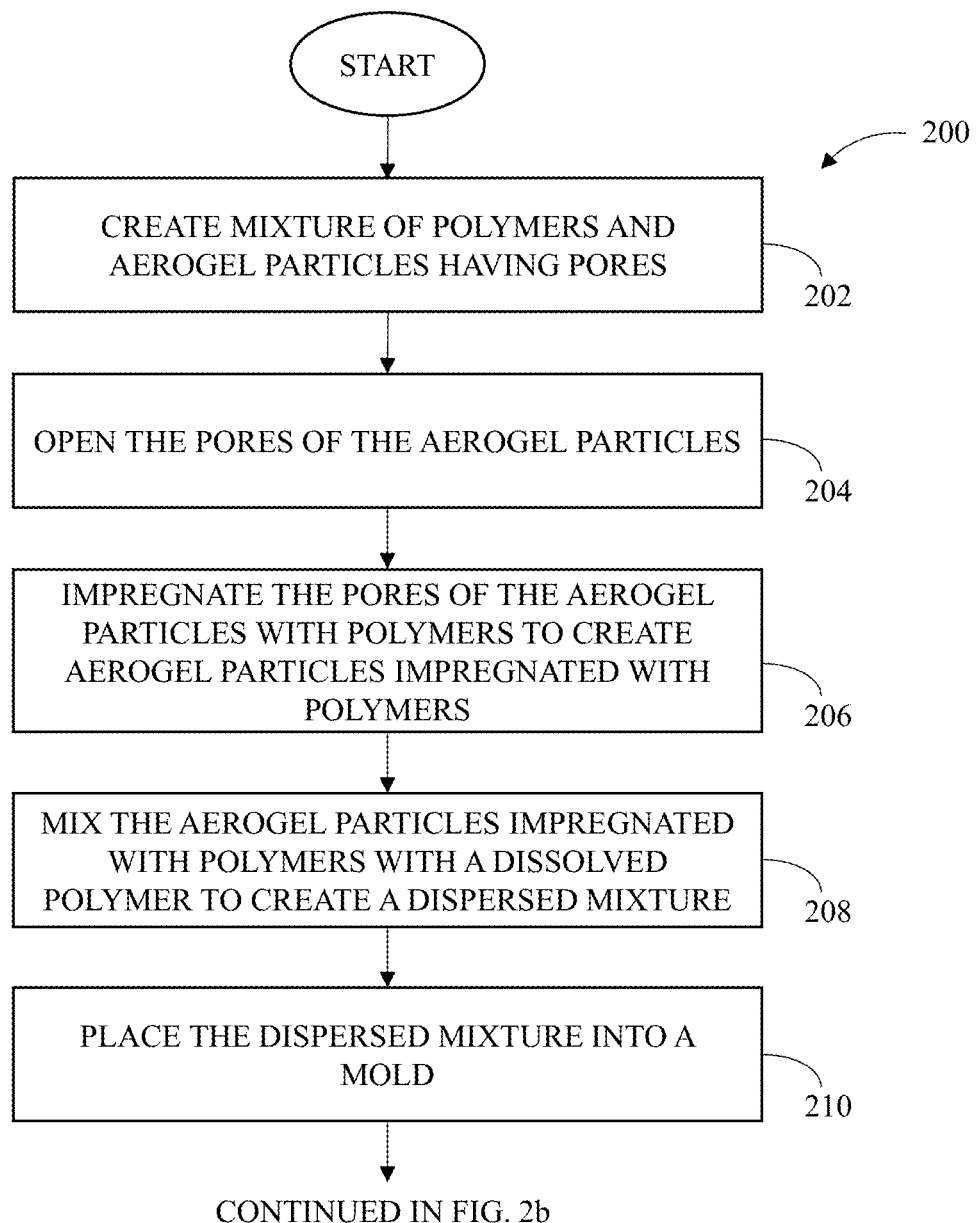
FIG. 2a is a second flow chart showing a method of producing a metal form containing dispersed aerogel particles impregnated with polymers.
Figure 2B:
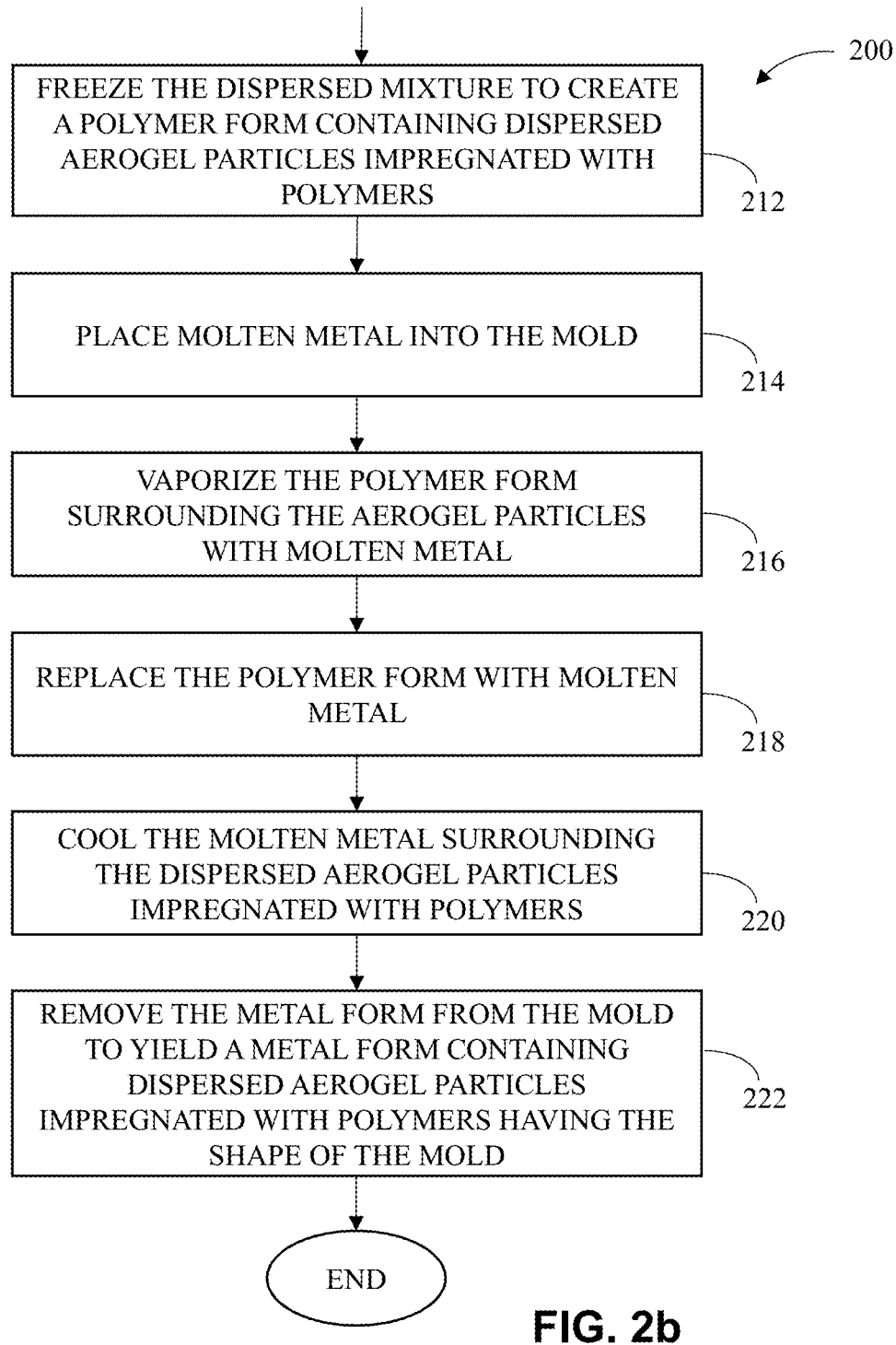
FIG. 2b is the continued flow chart from FIG. 2a showing the method of producing the metal form containing dispersed aerogel particles impregnated with polymers.

Method 200, which can be seen in FIGS. 2a and 2b, illustrates a second method of producing a metal form containing dispersed aerogel particles impregnated with polymers. Method 200 starts with step 202 by creating a mixture of polymers and aerogel particles. The aerogel particles have pores in order for them to later be impregnated with the polymers. Method 200 then continues to step 204.

During step 204, the pores of the aerogel particles are dilated in order to allow for impregnation. The process of dilating the pores may be done by increasing the temperature of the aerogel particles or by any other process that may enlarge the pores of the aerogel particles. During step 206, the pores of the aerogel particles are impregnated with polymers creating an aerogel impregnated with polymers. This may be completed by first placing the mixture of aerogel particles and polymers within a pressure chamber. By increasing the pressure and temperature within the pressure chamber, the pores of the aerogel particles are dilated and the polymers are allowed to impregnate the pores of the aerogel particles. Once step 206 is complete, the method 200 continues to step 208.

During step 208, the aerogel particles impregnated with polymers are placed into a mixture with a dissolved polymer creating a dispersed mixture. The dissolved polymer may consist of one or more of polyester, polyethylene, terephthalate, polyolefin, polyacrylic acid, polymethylacrylate, expoxy, polymethyl methacrylate, acrylonitrile butadiene styrene, polyimides, polyamides, polycaprolactam, polylactic acid, polybenzimidazole, polycarbonate, polyether sulfone, polyetherether ketone, polyetherimide, polyethylene, polyphenylene oxide, polyphenylene sulfide, polypropylene, polystyrene, polyvinyl chloride, and polytetrafluoroethylene. The aerogel particles impregnated with polymers may also be mixed with filler material. The filler material may comprise graphene, graphene oxide, carbon nanotubes, cellulose nanocrystals as well as other two and three dimensional materials. The method 200 then continues to step 210.

During step 210, the dispersed mixture is placed into a mold of a desired shape. The mold may be of any shape and size suitable to hold the dispersed mixture. The method 200 moves to step 212 where the dispersed mixture is frozen in order to solidify the dissolved polymers to create a polymer form containing dispersed aerogel particles impregnated with polymers. This step may be completed within a pressure chamber by decreasing the temperature within the pressure chamber in order to freeze the dispersed mixture. Next, the method 200 continues to step 214

During step 214, molten metal is placed into the mold. The metal used may be a molten form of one or more of boron, silicon, germanium, antimony, lithium, sodium, potassium, rubidium, cesium, beryllium, magnesium, calcium, strontium, aluminum, titanium, manganese, iron, cobalt, nickel, copper, zinc, gallium, zirconium, molybdenum, silver, cadmium, indium, tin, neodymium, samarium, europium, gadolinium, terbium, dysprosium, holmium, erbium, thulium, ytterbium, lutetium, hafnium, tantalum, tungsten, platinum, gold, mercury, lead, bismuth, and transactinide metals. Once the molten metal is placed in the mold the method 200 continues to step 216.

During step 216, the molten metal begins to vaporize the polymer form without damaging the aerogel particles impregnated with polymers. The aerogel particles dispersed throughout the polymer form remain in place while the molten metal vaporizes the polymer form. During step 218, the molten metal replaces the polymer form after being completely vaporized. The molten metal takes the place of the polymer form and the dispersed aerogel particles continue to remain in the desired location. Once the polymer form is replaced with molten metal, a metal form containing dispersed aerogel particles impregnated with polymers is created.

The method 200 continues to step 220 where the metal form is cooled so that the metal may harden and form a solid metal form. During step 222, the metal form is removed from the mold which yields a metal form containing dispersed aerogel particles impregnated with polymers having the shape of the mold. This ends the method 200 by creating the desired end result of the metal form containing dispersed aerogel particles impregnated with polymers.

Figure 3:
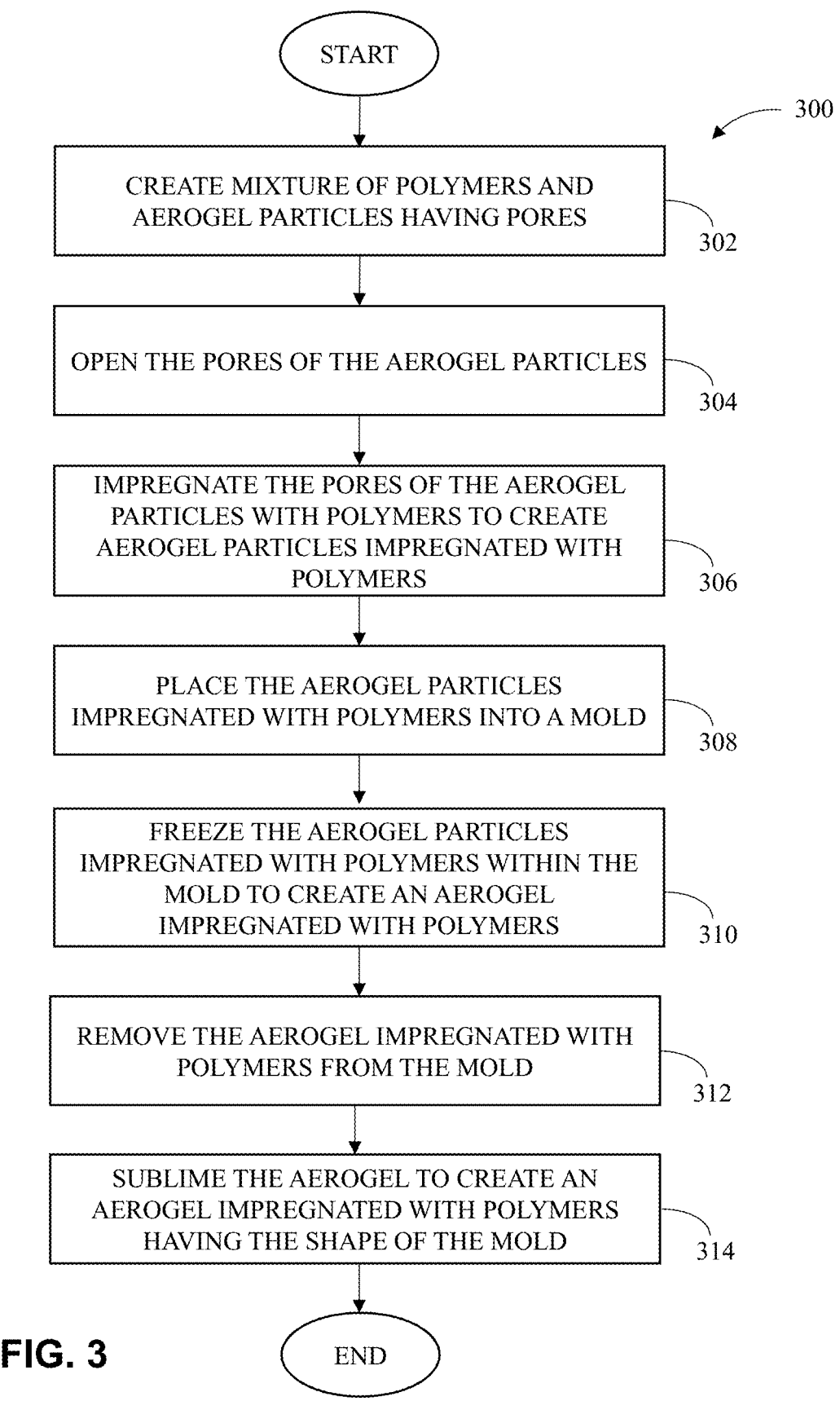
FIG. 3 is a flow chart showing a method of producing an aerogel impregnated with polymers.

Method 300, shown in FIG. 3, illustrates a method of producing an aerogel impregnated with polymers. Method 300 starts with step 302 beginning with creating a mixture of polymers and aerogel particles. The aerogel particles have pores in order for them to later be impregnated with the polymers. Method 300 then continues to step 304.

During step 304, the pores of the aerogel particles are dilated in order to allow for impregnation. The process of dilating the pores may be done by increasing the temperature of the aerogel particles or by any other process that may enlarge the pores of the aerogel particles. During step 306, the pores of the aerogel particles are impregnated with polymers creating an aerogel impregnated with polymers. This may be completed by first placing the mixture of aerogel particles and polymers within a pressure chamber. By increasing the pressure and temperature within the pressure chamber, the pores of the aerogel particles are dilated and the polymers are allowed to impregnate the pores of the aerogel particles. Once step 306 is complete, the method 300 continues to step 308.

During step 308, the aerogel particles impregnated with polymers are placed into a mold of a desired shape. The mold may be of any shape and size suitable to hold the aerogel particles impregnated with polymers. The method 300 moves to step 310 where the aerogel particles impregnated with polymers are frozen in order to create a single aerogel impregnated with polymers having a desired shape and size. This step may be completed within a pressure chamber by decreasing the temperature within the pressure chamber in order to freeze the aerogel particles impregnated with polymers. Next, the method 300 continues to step 312

During step 312, the aerogel impregnated with polymers is removed from the mold and then in step 314, the aerogel impregnated with polymers is sublimed in order to yield and aerogel impregnated with polymers having the shape of the mold. This ends the method 300.

Figure 4:
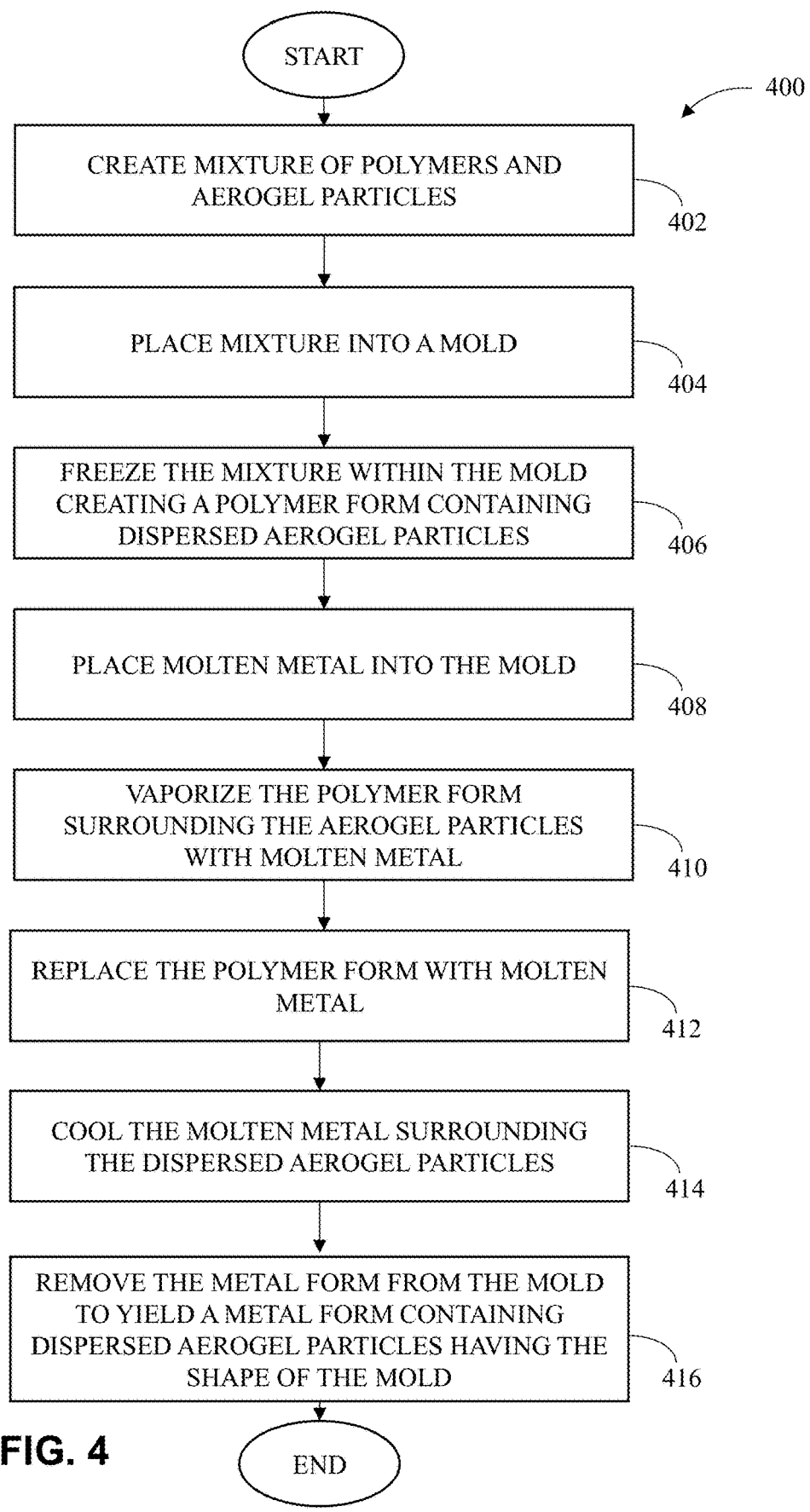
FIG. 4 is a flow chart showing a method of producing a metal form containing dispersed aerogel particles.
Figure 5A:
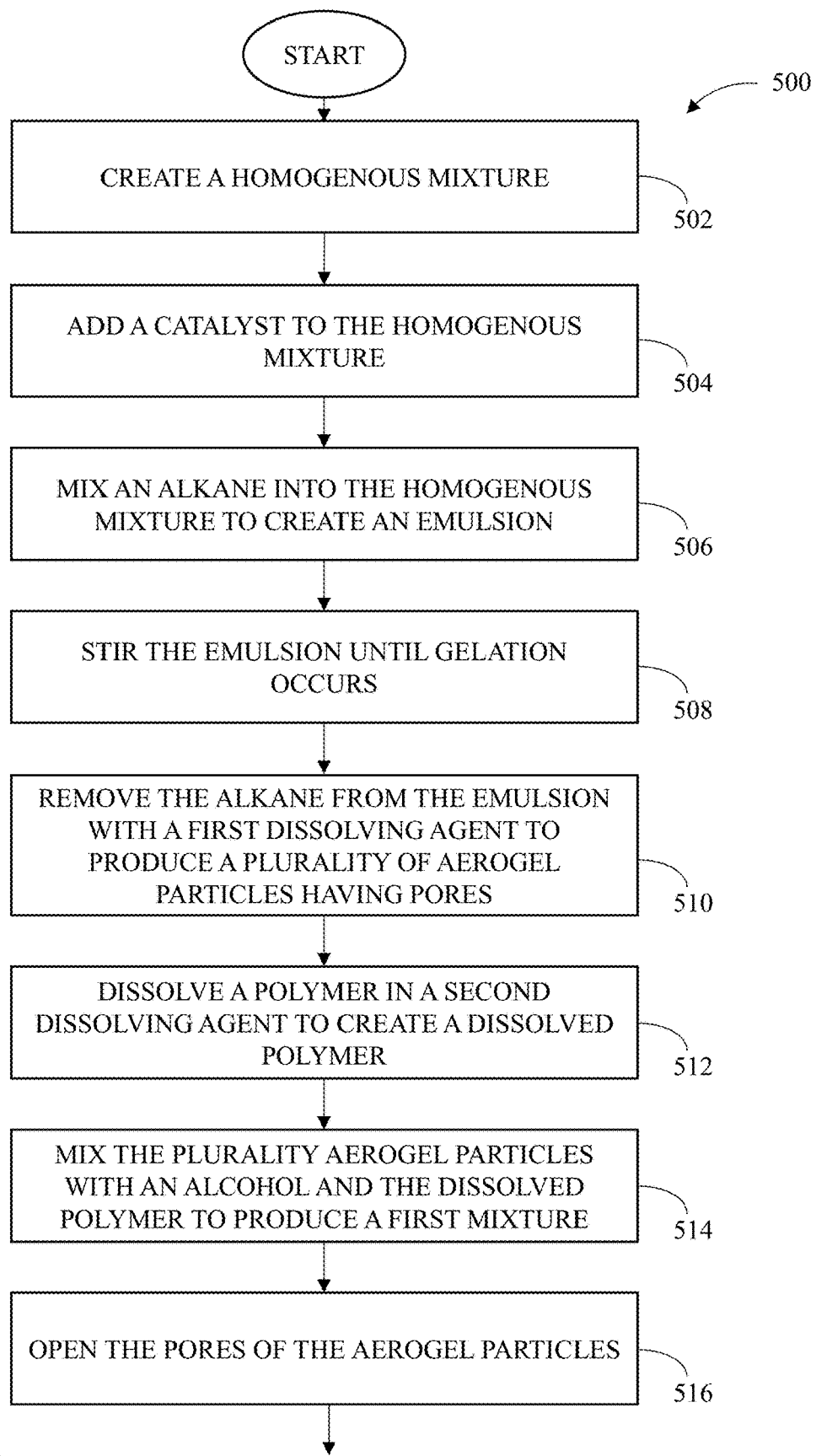
FIG. 5a is a flow chart showing another embodiment of a method of producing a metal form containing dispersed aerogel particles impregnated with polymers.
Figure 5B:
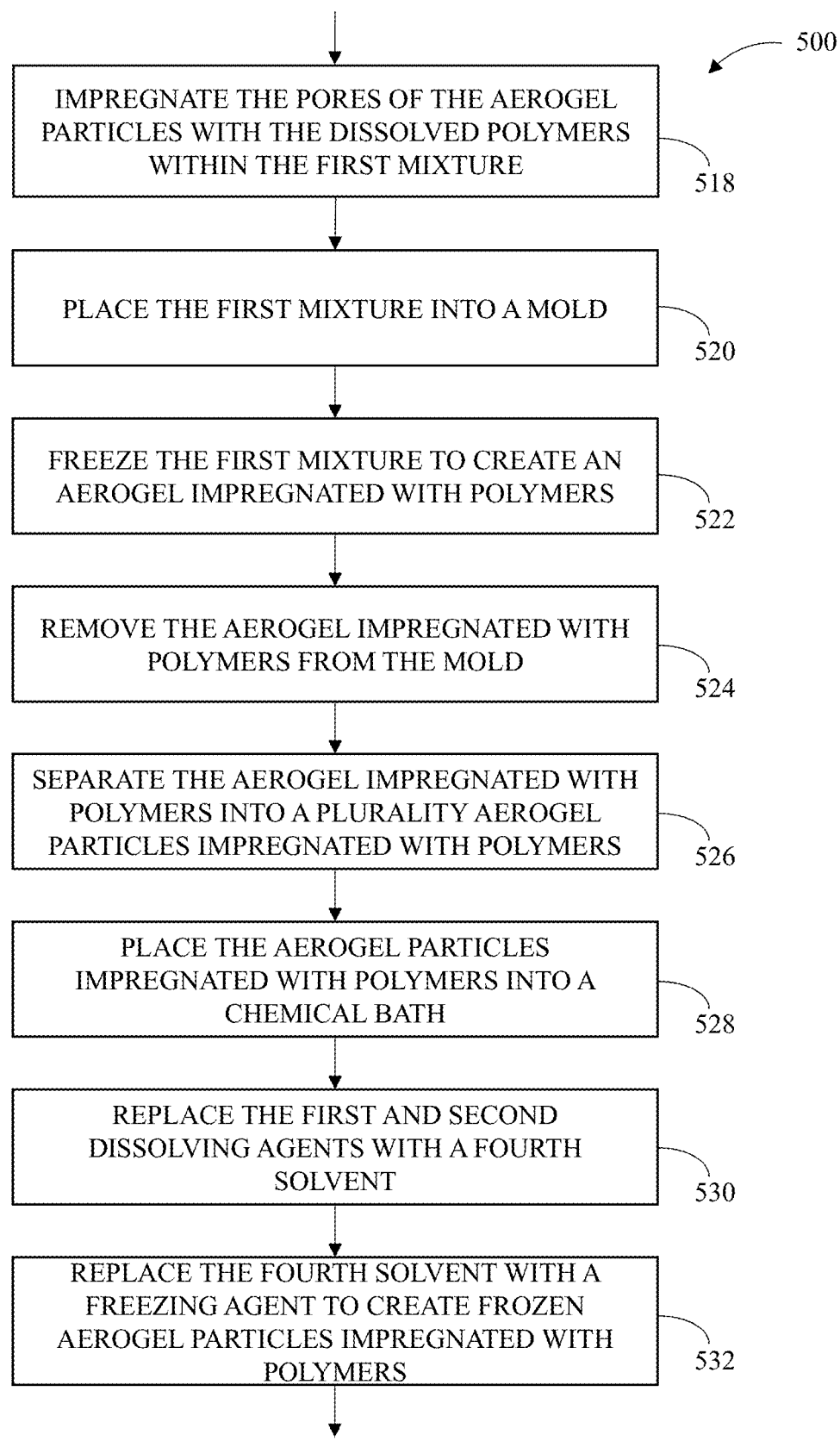
FIG. 5b is the continued flow chart from FIG. 5a showing another embodiment of the method of producing the metal form containing dispersed aerogel particles impregnated with polymers.
Figure 5D:
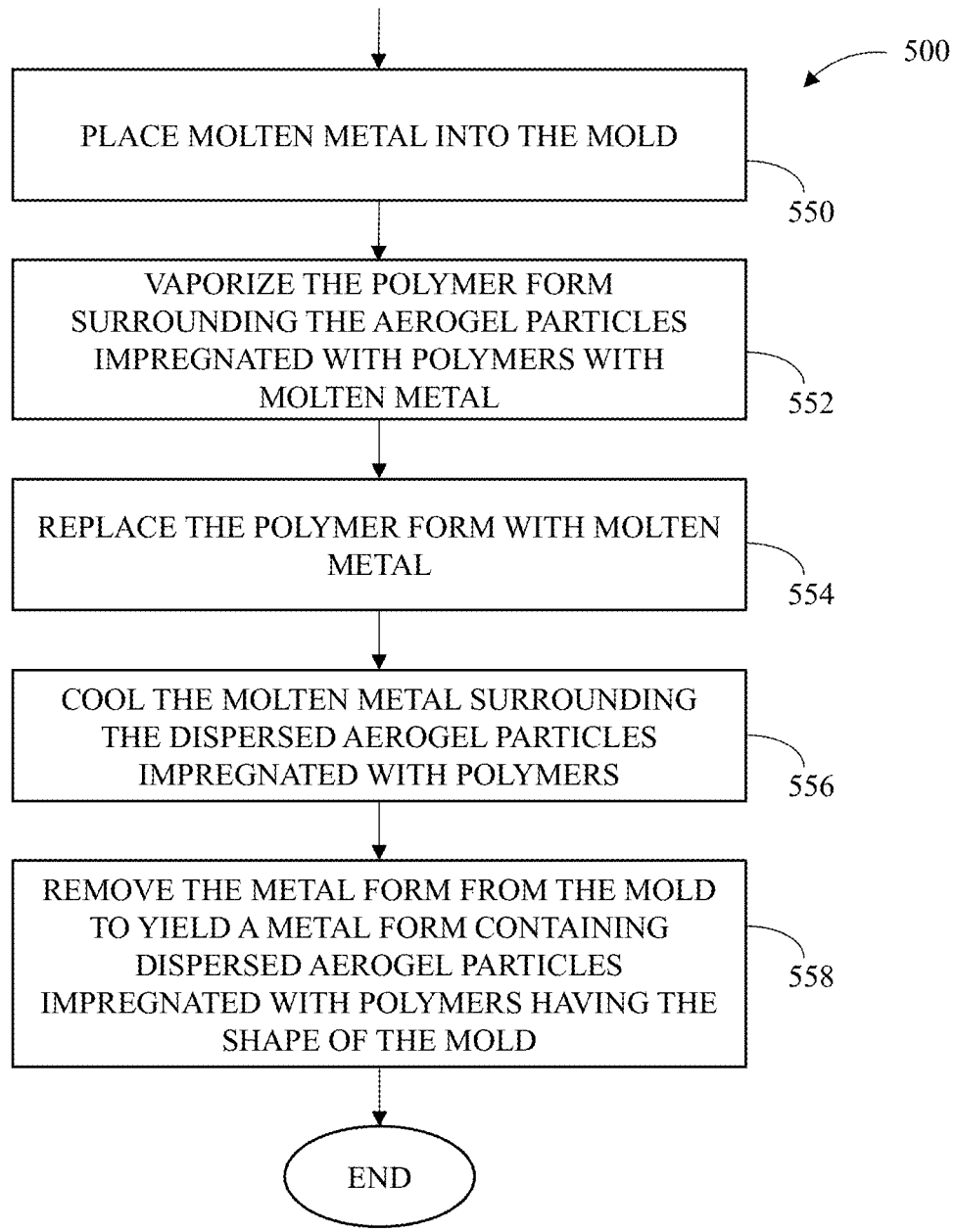
FIG. 5d is the continued flow chart from FIG. 5c showing another embodiment of the method of producing the metal form containing dispersed aerogel particles impregnated with polymers.

Method 400, shown in FIG. 4, illustrates a method of producing a metal form containing dispersed aerogel particles. Method 400 starts with step 402 beginning with creating a mixture of polymers and aerogel particles. Method 400 then continues to step 404.

During step 404, the mixture of polymers and aerogel particles is placed into a mold. During step 406, the mixture is frozen within the mold creating a polymer form containing dispersed aerogel particles. The mixture may be frozen by placing the mixture of polymers and aerogel particles within a pressure chamber and by lowering the temperature within the pressure chamber. The method 400 then continues to step 408.

During step 408, molten metal is placed into the mold. The metal used may be a molten form of one or more of boron, silicon, germanium, arsenic, antimony, tellurium, polonium, lithium, sodium, potassium, rubidium, cesium, francium, beryllium, magnesium, calcium, strontium, barium, radium, aluminum, scandium, titanium, vanadium, chromium, manganese, iron, cobalt, nickel, copper, zinc, gallium, yttrium, zirconium, niobium, molybdenum, technetium, ruthenium, rhodium, palladium, silver, cadmium, indium, tin, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, thallium, lead, bismuth, transactinide metals. Once the molten metal is placed in the mold the method 400 continues to step 410.

During step 410, the molten metal begins to vaporize the polymer form without damaging the aerogel particles. The aerogel particles dispersed throughout the polymer form remain in place while the molten metal vaporizes the polymer form. During step 412, the molten metal replaces the polymer form after being completely vaporized. The molten metal takes the place of the polymer form and the dispersed aerogel particles continue to remain in the desired location. Once the polymer form is replaced with molten metal, a metal form containing dispersed aerogel particles is created.

The method 400 continues to step 414 where the metal form is cooled so that the metal may harden and form a solid metal form. During step 416, the metal form is removed from the mold which yields a metal form containing dispersed aerogel particles having the shape of the mold. This ends the method 400 by creating the desired end result of the metal form containing dispersed aerogel particles.

Method 500, shown in FIGS. 5a, 5b, 5c, and 5d, illustrates another embodiment of a method of producing a metal form containing dispersed aerogel particles impregnated with polymers which begins at step 502 with creating a homogenous mixture. The homogenous mixture starts the process of creating aerogel particles. The homogenous mixture is comprised of one or more solvents which may be selected from the following: methyltrimethoxysilane, hexadecyl trimethyl ammonium bromide, deionized water, ketone, aldehyde, alkyl alkanoate, formamide, V-methylpyrrolidone, dimethyl sulfoxide, aliphatic halogenated hydrocarbons, cycloaliphatic halogenated hydrocarbons, halogenated aromatic compounds, fluorinated ethers, acetaldehyde, propionaldehyde, n-butyraldehyde, isobutyraldehyde, 2-ethylbutyraldehyde, valeraldehyde, isopentaldehyde, 2-methylpentaldehyde, 2-ethylhexaldehyde, acrolein, methanol, ethanol, propanol, isopropanol, butanol, sec-butanol, ferf-butanol, pentanol, neopentanol, amyl alcohol, acetone, methylethyl, acetonitrile, dimethylacetamide, N,N'-dimethylformamide, dimethylsulfoxide, ethyl acetate, amyl acetate, cyclohexanol, cyclohexane, pentane, hexane, heptane, alcohols, pyrrolidones, and other appropriate solvents. Upon mixing three of the above listed solvents together, the mixture is mixed under vigorous stirring until the mixture is homogenous creating a homogenous mixture. Once the homogeneous mixture is created, the process moves to Step 504.

Step 504 consists of stirring a catalyst into the homogenous mixture in order to produce a liquid containing solid nanoparticles. The catalyst activates one or more of the solvents within the homogenous mixture to create solid nanoparticles suspended in the homogeneous mixture. The catalyst may be selected from a group comprising of primary amines, secondary amines, tertiary amines, triazine derivatives, organometallic compounds, metal chelates, quaternary ammonium salts, ammonium hydroxides, alkali metals, alkaline earth metal hydroxides, alkoxides, and carboxylates. Once the catalyst is added and stirred into the homogenous mixture then method 500 moves to step 506.

During step 506, a hydrocarbon is added to the homogenous mixture in order to create an emulsion. An emulsion, as used herein, is defined as a mixture containing more than one liquid. The hydrocarbon may be one of hexane, acetone, acetonitrile, acetic acid, amyl alcohol, benzene, carbon tetrachloride, cholrobenzene, chloroform, cyclo-cresylic acid, hexane, isopropyl alcohol, di-methyl formamid, ethanol, ethyl acetate, furfural, furfural alcohol, methanol, N-butane, N-heptane, N-hexane, and pyridine. Once the emulsion is created, the method 500 continues to step 508.

During step 508, the emulsion is stirred until gelation occurs. Gelation, as used herein, is defined as solidification by freezing. The emulsion may be subjected to low temperatures to promote gelation or gelation may occur through chemical reactions taking place within the homogenous mixture. Once gelation occurs, the method continues to step 510.

During step 510, a first dissolving agent is used to remove the hydrocarbon from the emulsion. Removing the hydrocarbon from the emulsion leaves the created aerogel particles which contain pores. The first dissolving agent may be one of acetonitrile, 2-methoxyethanol, (2, 6, 10, 14)-tetramethyl pentadecane, acetone, alcohols, amyl alcohol, amylacetate, aniline, N-butanol, N-butanol, sec-butanol, ie/t-butanol, chlorex, cyclohexanol, C1-C6 alcohols cyclohexanone, cresylic acid, dimethylsulfoxide, Dimethylacetamide, dimethylformamide, N,N'-dimethylformamide, ethanol, furfural, furfural alcohol, ft-propanol, pyridine, hexane, hexanes, N-hexane, hydrocarbons, isopropanol, isopropanol, methanol, methoxyethanol, N-Methylpyrollidone, nitrobenzene, pentanol, liquid $SO_2$, quinolone, and xylene. Once the hydrocarbon is removed, the method continues to step 512.

During step 512, a polymer is placed within a second dissolving agent to dissolve the polymer creating a dissolved polymer. The polymer may be one of polyester, polyethylene, terephthalate, polyolefin, polyacrylic acid, polymethylacrylate, expoxy, polymethyl methacrylate, acrylonitrile butadiene styrene, polyimides, polyamides, polycaprolactam, polylactic acid, polybenzimidazole, polycarbonate, polyether sulfone, polyetherether ketone, polyetherimide, polyethylene, medium-density polyethylene, low-density polyethylene, polyphenylene oxide, polyphenylene sulfide, polypropylene, polystyrene, polyvinyl chloride, and polytetrafluoroethylene. The second dissolving agent may be similar to the first dissolving agent or may be selected from one of acetonitrile, 2-methoxyethanol, (2, 6, 10, 14)-tetramethyl pentadecane, acetone, alcohols, amyl alcohol, amylacetate, aniline, N-butanol, N-butanol, sec-butanol, ie/t-butanol, chlorex, cyclohexanol, C1-C6 alcohols cyclohexanone, cresylic acid, dimethylsulfoxide, dimethylacetamide, dimethylformamide, N,N'-dimethylformamide, ethanol, furfural, furfural alcohol, ft-propanol, pyridine, hexane, hexanes, N-hexane, hydrocarbons, isopropanol, isopropanol, methanol, methoxyethanol, N-Methylpyrollidone, nitrobenzene, pentanol, liquid $SO_2$, quinolone, and xylene. Once the dissolved polymer is created, the method moves to step 514.

During step 514, the aerogel particles are mixed with an alcohol and the dissolved polymer and then the mixture is mixed under vigorous stirring to create a first mixture. The alcohol may be one of ethanol, acetone, methanol, acetonitrile, acetic acid, amyl alcohol, benzene, carbon tetrachloride, cholrobenzene, cholroform, cyclo-cresylic acid, hexane, isopropyl alcohol, di-methyl formamid, ethanol, ethyl acetate, furfural, furfural alcohol, methanol, N-butane, N-heptane, N-hexane, and pyridine. Upon creating the first mixture, method 500 proceeds to step 516. The aerogel particles may be produced from the previous steps or created from other known methods within the art.

During step 516, the pores of the aerogel particles are dilated within the first mixture. The process of dilating the pores of the aerogel particles may be completed in a number of ways such as by increasing the temperature or the pressure of the aerogel particles. In this method, the aerogel particles may be placed within a pressure chamber so that the aerogel particles are subjected to high temperature and increased pressure in order to dilate the pores of the aerogel particles. Once the pores of the aerogel particles are dilated, the method 500 moves to step 518.

During step 518, the aerogel particles having dilated pores are impregnated with the dissolved polymers within the first mixture creating aerogel particles impregnated with polymers. This step may take place within a pressure vessel where the temperature and pressure within the vessel is increased in order to allow the polymers to enter the pores of the aerogel particles, thereby impregnating the aerogel particles with polymers. Once the impregnation step is completed then the method 500 continues to step 520.

During step 520, the first mixture containing the aerogel particles impregnated with polymers is placed into a first mold. The mold may be of any shape or design suitable for the entire contents of the first mixture. The method continues to step 522.

During step 522, the first mixture is subjected to low temperatures to induce freezing. The temperature may be variable depending on the solvents and polymers used within the first mixture. Freezing the first mixture creates a solid form comprising an aerogel impregnated with polymers. This step may be completed within a pressure chamber by lowering the temperature within the pressure chamber in order to freeze the first mixture. Once the aerogel impregnated with polymers is frozen solid then the method 500 continues to step 524.

During step 524, the aerogel impregnated with polymers is removed from the first mold and are separated into many aerogel particles impregnated with polymers in step 526. The aerogel particles impregnated with polymers may optionally be mixed with filler material. The filler material may comprise graphene, graphene oxide, carbon nanotubes, cellulose nanocrystals as well as other two and three dimensional materials. In step 528, the aerogel particles impregnated with polymers are placed into a chemical bath. The chemical bath works as a cleaning agent and the chemicals used may be selected from one or more of hexane, acetone, acetonitrile, acetic acid, amyl alcohol, benzene, carbon tetrachloride, cholrobenzene, cholroform, cyclo-cresylic acid, hexane, isopropyl alcohol, di-methyl formamid, ethanol, ethyl acetate, furfural, furfural alcohol, methanol, N-butane, N-heptane, N-hexane, and pyridine. Once the aerogel particles impregnated with polymers are placed in the chemical bath, the method 500 continues to step 530.

During step 530, the first and second dissolving agents dispersed throughout the aerogel particles impregnated with polymers are replaced with a fourth solvent. The process of replacing may be completed through solvent exchange which allows the fourth solvent to replace a different solvent, in this case the dissolving agents, which is miscible with the fourth solvent. The step of replacing the first and second dissolving agents with a fourth solvent may be completed within a pressure chamber. This may be conducted by flushing the pressure chamber, while the aerogel particles impregnated with polymers are within the pressure chamber, with the fourth solvent in order to remove the first and second dissolving agents and leave the fourth solvent within the aerogel particles, thereby exchanging the first and second dissolving agents with the fourth solvent. The fourth solvent may be selected from one of one or more of hexane, acetone, acetonitrile, acetic acid, amyl alcohol, benzene, carbon tetrachloride, cholrobenzene, cholroform, cyclo-cresylic acid, hexane, isopropyl alcohol, di-methyl formamide, ethanol, ethyl acetate, furfural, furfural alcohol, methanol, N-butane, N-heptane, N-hexane, and pyridine. Then during step 532, the fourth solvent is replaced with a freezing agent through another solvent exchange process because the freezing agent and fourth solvent are miscible with one another. By replacing the fourth solvent with a freezing agent, the aerogel particles impregnated with polymers are frozen creating frozen aerogel particles impregnated with polymers. The freezing agent may be selected from liquid carbon dioxide, supercritical carbon dioxide, nitrous oxide, and supercritical dihydrogen monoxide.

During step 534, the frozen aerogel particles impregnated with polymers are sublimed. This creates sublimed aerogel particles impregnated with polymers and ends step 534, thus moving method 500 to step 536.

During step 536, a second polymer is placed in a third dissolving agent in order to create a second dissolved polymer. The second polymer may be selected from one of polyester, polyethylene, terephthalate, polyolefin, polyacrylic acid, polymethylacrylate, expoxy, polymethyl methacrylate, acrylonitrile butadiene styrene, polyimides, polyamides, polycaprolactam, polylactic acid, polybenzimidazole, polycarbonate, polyether sulfone, polyetherether ketone, polyetherimide, polyethylene, polyphenylene oxide, polyphenylene sulfide, polypropylene, polystyrene, polyvinyl chloride, and polytetrafluoroethylene. The third dissolving agent may be similar to the first or second dissolving agent or may be entirely new selected from one of methyltrimethoxysilane, hexadecyl trimethyl ammonium bromide, deionized water, ketone, aldehyde, alkyl alkanoate, formamide, /V-methylpyrrolidone, dimethyl sulfoxide, aliphatic halogenated hydrocarbons, cycloaliphatic halogenated hydrocarbons, halogenated aromatic compounds, fluorinated ethers, acetaldehyde, propionaldehyde, n-butyraldehyde, isobutyraldehyde, 2-ethylbutyraldehyde, valeraldehyde, isopentaldehyde, 2-methylpentaldehyde, 2-ethylhexaldehyde, acrolein, methanol, ethanol, propanol, isopropanol, butanol, sec-butanol, ferf-butanol, pentanol, neopentanol, amyl alcohol, acetone, methylethyl, acetonitrile, dimethylacetamide, N,N'-dimethylformamide, dimethyl sulfoxide, ethyl acetate, amyl acetate, cyclohexanol, cyclohexane, pentane, hexane, heptane, alcohols, and pyrolidones. Step 536 ends and the method 500 continues to step 538.

During step 538, the sublimed aerogel particles impregnated with polymers are mixed with the second dissolved polymer to create a second mixture. The method 500 continues to step 538.

During step 540, the second mixture is placed into a second mold in order to form a shaped mixture. In step 542, the third dissolving agent is exchanged with a freezing agent. The freezing agent may be selected from one of liquid carbon dioxide, supercritical carbon dioxide, nitrous oxide, and supercritical dihydrogen monoxide. The process of exchanging may take place within a pressure vessel similar to step 530. This may be completed by flushing the pressure vessel with a freezing agent, thereby replacing the third dissolving agent with the freezing agent. Once step 542 is complete, the method 500 continues to step 544.

During step 544, the shaped mixture is frozen creating a polymer form containing dispersed aerogel particles impregnated with polymers. The aerogel particles impregnated with polymers were dispersed throughout the shaped mixture and surrounded the second dissolved polymer. When then shaped mixture is frozen the second dissolved polymer freezes and surrounds the dispersed aerogel particles impregnated with polymers creating a polymer form containing dispersed aerogel particles impregnated with polymers. Once the polymer form containing dispersed aerogel particles impregnated with polymers is frozen the method 500 continues to step 546.

During step 546, the polymer form containing dispersed aerogel particles impregnated with polymers is removed from the second mold and placed into a third mold with the desired shape of the final product. The third mold may be the same shape as the second mold or the third mold may be larger than the second mold. During step 548, a refractory material is placed around the polymer form containing dispersed aerogel particles impregnated with polymers. The method 500 continues to step 550 after the refractory material is placed around the polymer form.

During step 550, molten metal is placed into the third mold. The metal used may be a molten form of one or more of boron, silicon, germanium, arsenic, antimony, tellurium, polonium, lithium, sodium, potassium, rubidium, cesium, francium, beryllium, magnesium, calcium, strontium, barium, radium, aluminum, scandium, titanium, vanadium, chromium, manganese, iron, cobalt, nickel, copper, zinc, gallium, yttrium, zirconium, niobium, molybdenum, technetium, ruthenium, rhodium, palladium, silver, cadmium, indium, tin, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, thallium, lead, bismuth, and transactinide metals. Once the molten metal is placed in the third mold, the method 500 continues to step 552.

During step 552, the molten metal begins to vaporize the polymer form without damaging the aerogel particles impregnated with polymers. The aerogel particles dispersed throughout the polymer form remain in place while the molten metal vaporizes the polymer form. During step 554, the molten metal replaces the polymer form after being completely vaporized. The molten metal takes the place of the polymer form and the dispersed aerogel particles continue to remain in the desired location. Once the polymer form is replaced with molten metal, a metal form containing dispersed aerogel particles impregnated with polymers is created.

The method 500 continues to step 556 where the metal form is cooled so that the metal may harden and form a solid metal form. During step 558, the metal form is removed from the third mold which yields a metal form containing dispersed aerogel particles impregnated with polymers having the shape of the third mold. The process of cooling the molten metal form may be completed within a pressure vessel by lowering the temperature within the pressure vessel. This ends the method 500 by creating the desired end result of the metal form containing dispersed aerogel particles impregnated with polymers.

Figure 6:
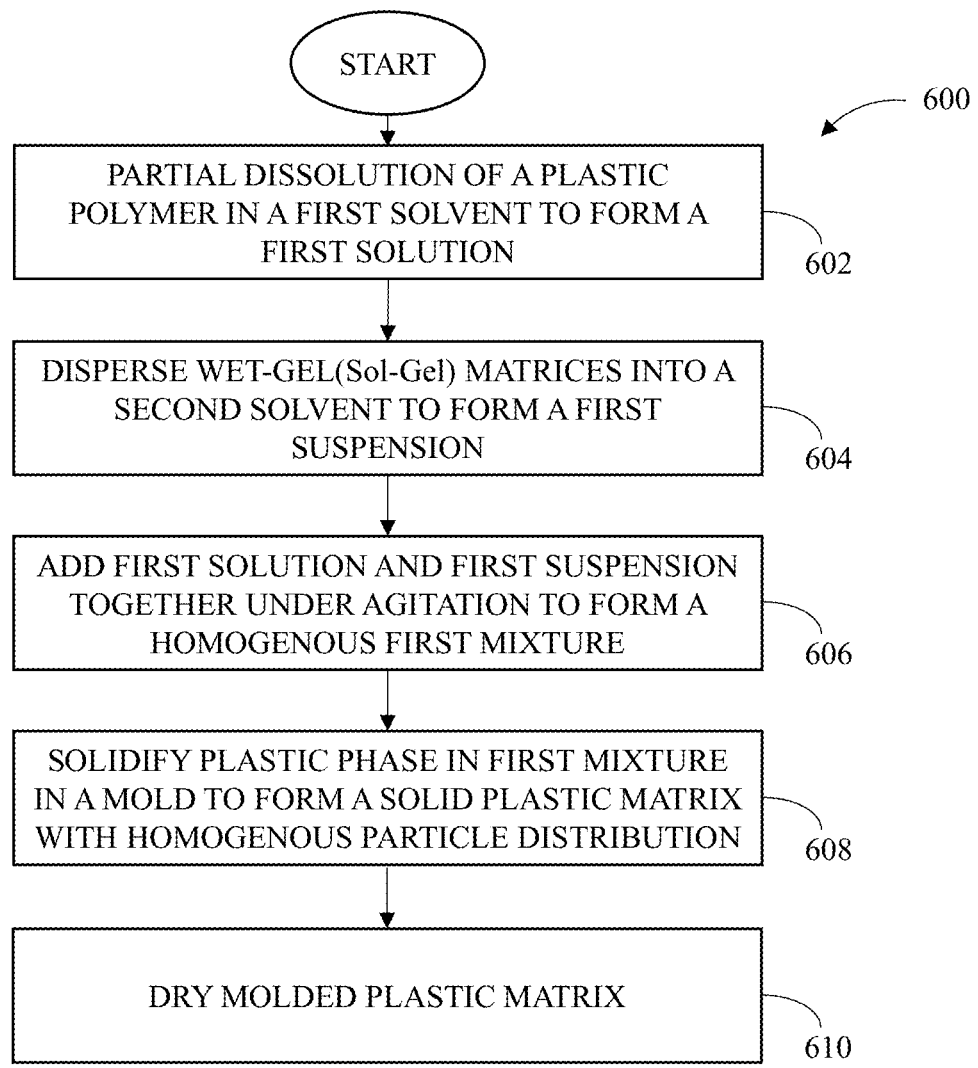
FIG. 6 shows a further method of forming an aerogel structure with an impregnated thermoplastic structure.

FIG. 6 shows a method 600 of producing the aerogel structure. In step 602 of the method 100, a starting plastic that is a plastic polymer is partially dissolved in a first solvent to form a first solution. In some embodiments, the starting plastic is in the form of pellets. In some embodiments, the starting plastic is in the form of powder. In some embodiments, the starting plastic is in the form of filaments. In some embodiments, dissolution of the plastic polymer occurs without agitation at about or below room temperature. In some embodiments, dissolution of the plastic polymer occurs with agitation at about or below room temperature. In some embodiments, dissolution of the plastic polymer occurs without agitation by heating first solvent above room temperature but below the starting plastic's melting temperature. In some embodiments, dissolution of the plastic polymer occurs without agitation by heating first solvent above starting plastic's melting temperature. In some embodiments, dissolution of the plastic polymer occurs with agitation by heating first solvent above room temperature but below starting plastic's melting temperature. In some embodiments, dissolution of the plastic polymer occurs without agitation by heating first solvent above starting plastic's melting temperature. In some embodiments, the first solvent is 2-methoxyethanol, 2,6,10,14-tetramethyl pentadecane, acetone, acetonitrile, alcohols, amyl alcohol, amylacetate, aniline, N-butanol, N-butanol, sec-butanol, ie/t-butanol, chlorex, cyclohexanol, C1-C6 alcohols cyclohexanone, cresylic acid, dimethylsulfoxide, Dimethylacetamide, dimethylformamide, N,N'-dimethylformamide, ethanol, furfural, furfural alcohol, ft-propanol, pyridine, hexane, hexanes, N-hexane, hydrocarbons, isopropanol, isopropanol, methanol, methoxyethanol, N-Methylpyrollidone, nitrobenzene, pentanol, liquid SO2, quinolone, water, xylene, or a combination thereof. In some embodiments, starting plastic is any polymer described herein, including polyesters (including polyethylene terephthalate (PET)), polyurethane, polyolefin, poly(acrylic acid) (PAA), poly(methyl acrylate) (PMA), expoxy, poly(methyl methacrylate) (PMMA), acrylonitrile butadiene styrene (ABS), polyimides, polyamides (including polycaprolactam (nylon)), polylactic acid (PLA), polybenzimidazole, polycarbonate, polyether sulfone (PES), polyetherether ketone (PEEK), polyetherimide (PEI), polyethylene (PE; including ultra-high molecular weight polyethylene (UHMWPE), medium-density polyethylene (MDPE), low-density polyethylene (LDPE), and cross-lined polyethylene (PEX)), polyphenylene oxide (PPO), polyphenylene sulfide (PPS), polypropylene (PP), polystyrene (PS), polyvinyl chloride (PVC), polytetrafluoroethylene (PTFE), co-polymers thereof, or a combination thereof.

In step 604 of the method 600, particles are added to a second solvent to form a first suspension of sol-gel particles. In some embodiments, the particles are aerogel particles. In some embodiments, the aerogel particles are broken down, or micronized, prior to suspension. In some embodiments, the particles are sol-gel particles that have never been dried. In some embodiments, the second solvent is the same as the first solvent. In some embodiments, the second solvent is different from the first solvent. In some embodiments, the first and second solvents can have a difference in boiling points of at least 10° C., allowing for one of the solvents to be selectively removed through evaporation. In some embodiments, the second solvent can form an azeotrope with the second solvent. In some embodiments, dispersion of aerogel particles occurs with agitation at about or below room temperature. In some embodiments, dispersion of aerogel particles occurs with agitation by heating first solvent above room temperature but below starting plastics melting temperature. In some embodiments, dispersion of aerogel particles occurs with agitation by heating first solvent above starting plastics melting temperature. In some embodiments, the second solvent is acetone, acetonitrile, acetic acid, amyl alcohol, benzene, carbon tetrachloride, cholrobenzene, cholroform, cyclo-cresylic acid, hexane, isopropyl alcohol, di-methyl formamide, ethanol, ethyl acetate, furfural, furfural alcohol, methanol, N-butane, N-heptane, N-hexane, pyridine, or a combination thereof.

In step 606 of the method 600, the first solution and the first suspension are mixed to form a homogeneous first mixture. In some embodiments, the mixing process includes at least stirring. In some embodiments, the mixing process includes at least shaking. In some embodiments, the mixing process includes at least ultrasonication. In some embodiments, the first solution and the first suspension are mixed at temperature above room temperature but below the starting plastic's melting temperature. In some embodiments, the first solution and the first suspension are mixed at temperature above the starting plastic's melting temperature. Bonding agents can be added to the mixture, or its precursors, in order to achieve a desired level of crystallinity of thermoplastic in the final product. In some embodiments, reinforcing agents are further added to the mixture. In some embodiments, filler material is added to the mixture. In some embodiments, the filler material may be graphene.

In step 608 of the method 600, the first mixture is solidified in a mold to form a shaped solidified mixture. In some embodiments, the first mixture is solidified by evaporating a portion of at least one of the solvents. In some embodiments, the first mixture is solidified by evaporating a portion of more than one of the solvents in the mixture. In some embodiments, the first mixture is solidified by cooling the mixture. In some embodiments, the mixture is solidified by cooling the mixture at a rate of greater than or equal to 0.2° C. per minute. In some embodiments, the first mixture is solidified by cooling the mixture below the melting temperature of the plastic portion. In some embodiments, the first mixture is solidified by cooling the mixture below the melting temperature of the starting plastic. In some embodiments, the first mixture is solidified by cooling the mixture below the melting temperature of at least one of the solvents in the mixture. In some embodiments, the first mixture is solidified by cooling the mixture below the melting temperature of all of the solvents in the mixture.

In some embodiments, as a further part of step 608 of the method 600, the shaped solidified mixture is placed in a solvent bath containing an additional solvent that is at least partially miscible with at least one of the solvents in the solidified mixture, and where the plastic phase in the shaped solid mixture is insoluble in the additional solvent bath to precipitate the plastic phase through solvent exchange. In some embodiments, the solvent bath is at a temperature below the melting temperature of the starting plastic, but above the melting temperatures of the solvents in the first mixture. In some embodiments, the solvent bath is at a temperature below the melting temperature of the starting plastic and the melting temperatures of the solvents in the first mixture.

In step 610 of the method 600, the shaped solidified mixture is dried to remove the remaining solvent, leaving a dried plastic matrix with dispersed aerogel particles. In some embodiments, the aerogel particles are uniformly distributed. In some embodiments, the shaped solidified mixture is dried through supercritical fluid drying to remove the solvent. In some embodiments, supercritical $CO_2$ is the supercritical fluid used to remove the solvent. In some embodiments, supercritical $CO_2$ further plasticizes the plastic phase of the shaped solidified mixture. In some embodiments, supercritical $CO_2$ further swells the plastic phase of the shaped solidified mixture. In some embodiments, supercritical $CO_2$ further crystalizes the plastic phase of the solidified mixture. In some embodiments, the shaped solidified mixture is dried through freeze drying to remove the remaining solvent. In some embodiments, the shaped solidified mixture is dried through $CO_2$ freeze drying to remove the remaining solvent, as disclosed in U.S. Patent Application Ser. No. 2018/0274856. In some embodiments, the liquid or supercritical $CO_2$ used in $CO_2$ freeze drying further plasticizes the plastic phase of the shaped solidified mixture. In some embodiments, the liquid or supercritical $CO_2$ used in $CO_2$ freeze drying further swells the plastic phase of the shaped solidified mixture. In some embodiments, the liquid or supercritical $CO_2$ used in $CO_2$ freeze drying further crystalizes the plastic phase of the shaped solidified mixture.

The method 600 can be used produce a composite structure. The composite structure can be an aerogel matrix having pores dispersed throughout the aerogel matrix. In some embodiments, the pores are nanoporous. In some embodiments, the aerogel matrix is impregnated with a thermoplastic. In some embodiments the pores of the aerogel matrix are less than 10 nanometers in size. In some embodiments, the impregnated thermoplastic includes a thermoplastic matrix having thermoplastic pores dispersed throughout the thermoplastic matrix, with the thermoplastic pores that are nano-porous. In some embodiments, the thermoplastic has pores that are less than 10 nanometers in size. In some embodiments, the aerogel structure is at least 20% by weight of the composite structure. In some embodiments, the thermoplastic portion is crystalline. In some embodiments, the thermoplastic portion is semi-crystalline. In some embodiments, the thermoplastic portion is amorphous. In some embodiments, the composite structure includes graphene. In some embodiments, the composite structure contains filler material. In some embodiments, the filler material contains graphene. In some embodiments, the composite structure contains reinforcing agents.

The composite structure produced by the method 600 can further be used as a precursor to the production of the metal form produced as discussed above. The composite structure is then a metal form with an aerogel having an aerogel matrix and aerogel pores dispersed throughout the aerogel. In some embodiments, the pores could be nanoporous. In some embodiments, the aerogel matrix is impregnated with a thermoplastic. In some embodiments the pores of the aerogel matrix are less than 10 nanometers in size. In some embodiments, the impregnated thermoplastic includes a thermoplastic matrix having thermoplastic pores dispersed throughout the thermoplastic matrix, with the thermoplastic pores that are nano-porous. In some embodiments, the thermoplastic has pores that are less than 10 nanometers in size. In some embodiments, the aerogel structure is at least 20% by weight of the composite structure. In some embodiments, the thermoplastic portion is crystalline. In some embodiments, the thermoplastic portion is semi-crystalline. In some embodiments, the thermoplastic portion is amorphous. In some embodiments, the composite structure includes graphene. In some embodiments, the composite structure contains filler material. In some embodiments, the filler material contains graphene. In some embodiments, the composite structure contains reinforcing agents.

Figure 7:
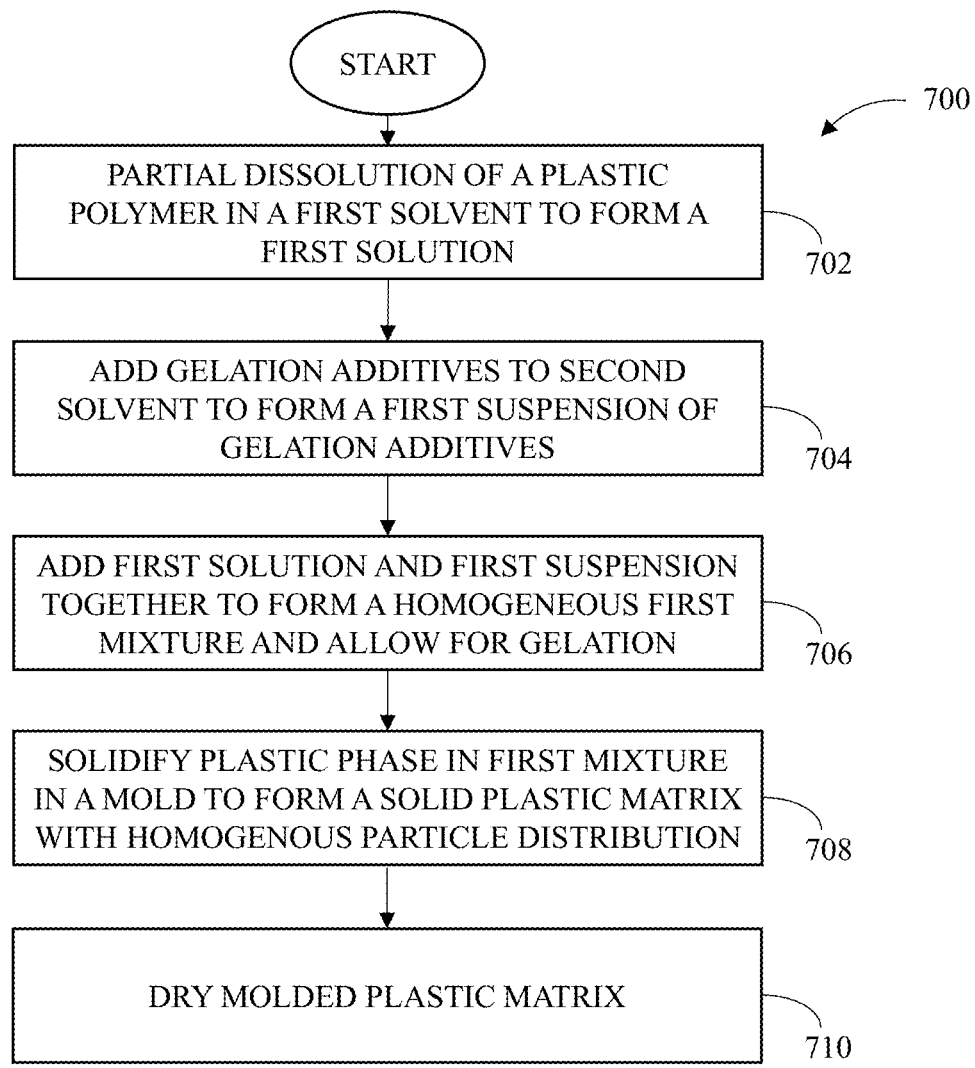
FIG. 7 shows a further method of forming an aerogel structure with an impregnated thermoplastic structure.

FIG. 7 shows a method 700 of producing the aerogel structure. In step 702 of the method 100, a starting plastic that is a plastic polymer is partially dissolved in a first solvent to form a first solution. In some embodiments, the starting plastic is in the form of pellets. In some embodiments, the starting plastic is in the form of powder. In some embodiments, the starting plastic is in the form of filaments. In some embodiments, dissolution of the plastic polymer occurs without agitation at about or below room temperature. In some embodiments, dissolution of the plastic polymer occurs with agitation at about or below room temperature. In some embodiments, dissolution of the plastic polymer occurs without agitation by heating first solvent above room temperature but below the starting plastic's melting temperature. In some embodiments, dissolution of the plastic polymer occurs without agitation by heating first solvent above starting plastic's melting temperature. In some embodiments, dissolution of the plastic polymer occurs with agitation by heating first solvent above room temperature but below starting plastic's melting temperature. In some embodiments, dissolution of the plastic polymer occurs without agitation by heating first solvent above starting plastic's melting temperature. In some embodiments, the first solvent is 2-methoxyethanol, 2,6,10,14-tetramethyl pentadecane, acetone, acetonitrile, alcohols, amyl alcohol, amylacetate, aniline, N-butanol, N-butanol, sec-butanol, ie/t-butanol, chlorex, cyclohexanol, C1-C6 alcohols cyclohexanone, cresylic acid, dimethylsulfoxide, Dimethylacetamide, dimethylformamide, N,N'-dimethylformamide, ethanol, furfural, furfural alcohol, ft-propanol, pyridine, hexane, hexanes, N-hexane, hydrocarbons, isopropanol, isopropanol, methanol, methoxyethanol, N-Methylpyrollidone, nitrobenzene, pentanol, liquid SO2, quinolone, water, xylene, or a combination thereof. In some embodiments, starting plastic is any polymer described herein, including polyesters (including polyethylene terephthalate (PET)), polyurethane, polyolefin, poly(acrylic acid) (PAA), poly(methyl acrylate) (PMA), expoxy, poly(methyl methacrylate) (PMMA), acrylonitrile butadiene styrene (ABS), polyimides, polyamides (including polycaprolactam (nylon)), polylactic acid (PLA), polybenzimidazole, polycarbonate, polyether sulfone (PES), polyetherether ketone (PEEK), polyetherimide (PEI), polyethylene (PE; including ultra-high molecular weight polyethylene (UHMWPE), medium-density polyethylene (MDPE), low-density polyethylene (LDPE), and cross-lined polyethylene (PEX)), polyphenylene oxide (PPO), polyphenylene sulfide (PPS), polypropylene (PP), polystyrene (PS), polyvinyl chloride (PVC), polytetrafluoroethylene (PTFE), co-polymers thereof, or a combination thereof.

In step 704 of the method 700, gelation additives are added to a second solvent to form a first suspension of gelation additives. As used herein, an "gelation additive" is a material added to a plastic to induce directed formation of aerogel sized nanporous networks via gelation and impart beneficial properties or decrease the amount of plastic used. Gelation additives may include primary stabilizers, secondary stabilizers, bonding agent catalysts, crosslinking agents, chain scission agents, fillers, reinforcing agent, functional reinforcing agent, or a plurality therefor of. Stabilizers are chemical compounds added to plastic dissolutions to inhibit auto-oxidation reactions, making the plastics more resistant to heat damage during processing and increasing the lifespan in applications. As used herein, "directed assembly" refers to the formation of porous networks radiating from tangentially oriented a semi-continuous polymer chains. As used herein, an "functional reinforcing agent" is reinforcing agent having at least one functional group reactively involved in the formation of a non-covalent bond when contacting a non-continuous polymer comprised of a fiber, rod, chain, particle, polymer, 2-dimensional material, few layered 2-dimensional material, nanotube, or a combination therefore of.

In some embodiments, the second solvent is the same as the first solvent. In some embodiments, the second solvent is different from the first solvent. In some embodiments, the first and second solvents can have a difference in boiling points of at least 10° C., allowing for one of the solvents to be selectively removed through evaporation. In some embodiments, the second solvent can form an azeotrope with the second solvent. In some embodiments, dispersion of gelation additives occurs with agitation at about or below room temperature. In some embodiments, dispersion of gelation additives occurs with agitation by heating first solvent above room temperature but below starting plastics melting temperature. In some embodiments, dispersion of gelation additives occurs with agitation by heating first solvent above starting plastics melting temperature. In some embodiments, the second solvent is acetone, acetonitrile, acetic acid, amyl alcohol, benzene, carbon tetrachloride, cholrobenzene, cholroform, cyclo-cresylic acid, hexane, isopropyl alcohol, di-methyl formamide, ethanol, ethyl acetate, furfural, furfural alcohol, methanol, N-butane, N-heptane, N-hexane, pyridine, or a combination thereof.

In step 706 of the method 700, the first solution and the first suspension are mixed to form a homogeneous first mixture until gelation occurs. In some embodiments, the mixing process includes at least stirring. In some embodiments, the mixing process includes at least shaking. In some embodiments, the mixing process includes at least ultrasonication. In some embodiments, the first solution and the first suspension are mixed at temperature above room temperature but below the starting plastic's melting temperature. In some embodiments, the first solution and the first suspension are mixed at temperature above the starting plastic's melting temperature. Bonding agents can be further added to the mixture, in order to achieve a desired level of crystallinity of thermoplastic in the final product. In some embodiments, reinforcing agents are further added to the mixture. In some embodiments, filler material is further added to the mixture. In some embodiments, the filler material may be graphene.

In step 708 of the method 700, the first mixture is solidified in a mold to form a shaped solidified mixture. In some embodiments, the first mixture is solidified by evaporating a portion of at least one of the solvents. In some embodiments, the first mixture is solidified by evaporating a portion of more than one of the solvents in the mixture. In some embodiments, the first mixture is solidified by cooling the mixture. In some embodiments, the mixture is solidified by cooling the mixture at a rate of greater than or equal to 0.2° C. per minute. In some embodiments, the first mixture is solidified by cooling the mixture below the melting temperature of the plastic portion. In some embodiments, the first mixture is solidified by cooling the mixture below the melting temperature of the starting plastic. In some embodiments, the first mixture is solidified by cooling the mixture below the melting temperature of at least one of the solvents in the mixture. In some embodiments, the first mixture is solidified by cooling the mixture below the melting temperature of all of the solvents in the mixture.

In some embodiments, as a further part of step 708 of the method 700, the shaped solidified mixture is placed in a solvent bath containing an additional solvent that is at least partially miscible with at least one of the solvents in the solidified mixture, and where the plastic phase in the shaped solid mixture is insoluble in the additional solvent bath to precipitate the plastic phase through solvent exchange. In some embodiments, the solvent bath is at a temperature below the melting temperature of the starting plastic, but above the melting temperatures of the solvents in the first mixture. In some embodiments, the solvent bath is at a temperature below the melting temperature of the starting plastic and the melting temperatures of the solvents in the first mixture.

In step 710 of the method 700, the shaped solidified mixture is dried to remove the remaining solvent, leaving a dried plastic matrix with dispersed aerogel matrices. In some embodiments, the shaped solidified mixture is dried through ambient pressure drying. In some embodiments, the aerogel matriciess are uniformly distributed. In some embodiments, the shaped solidified mixture is dried through supercritical fluid drying to remove the solvent. In some embodiments, supercritical CO2 is the supercritical fluid used to remove the solvent. In some embodiments, supercritical CO2 further plasticizes the plastic phase of the shaped solidified mixture. In some embodiments, supercritical CO2 further swells the plastic phase of the shaped solidified mixture. In some embodiments, supercritical CO2 further crystalizes the plastic phase of the solidified mixture. In some embodiments, the shaped solidified mixture is dried through freeze drying to remove the remaining solvent. In some embodiments, the shaped solidified mixture is dried through CO2 freeze drying to remove the remaining solvent, as disclosed in U.S. Patent Application Ser. No. 2018/0274856. In some embodiments, the liquid or supercritical CO2 used in CO2 freeze drying further plasticizes the plastic phase of the shaped solidified mixture. In some embodiments, the liquid or supercritical CO2 used in CO2 freeze drying further swells the plastic phase of the shaped solidified mixture. In some embodiments, the liquid or supercritical CO2 used in CO2 freeze drying further crystalizes the plastic phase of the shaped solidified mixture.

The method 700 can be used produce a composite structure. The composite structure can be an aerogel matrix having pores dispersed throughout the aerogel matrix. In some embodiments, the pores are nanoporous. In some embodiments, the aerogel matrix is impregnated with a thermoplastic. In some embodiments the pores of the aerogel matrix are less than 10 nanometers in size. In some embodiments, the impregnated thermoplastic includes a thermoplastic matrix having thermoplastic pores dispersed throughout the thermoplastic matrix, with the thermoplastic pores that are nano-porous. In some embodiments, the thermoplastic has pores that are less than 10 nanometers in size. In some embodiments, the aerogel structure is at least 20% by weight of the composite structure. In some embodiments, the thermoplastic portion is crystalline. In some embodiments, the thermoplastic portion is semi-crystalline. In some embodiments, the thermoplastic portion is amorphous. In some embodiments, the composite structure includes graphene. In some embodiments, the composite structure contains filler material. In some embodiments, the filler material contains graphene. In some embodiments, the composite structure contains reinforcing agents.

Figure 8:
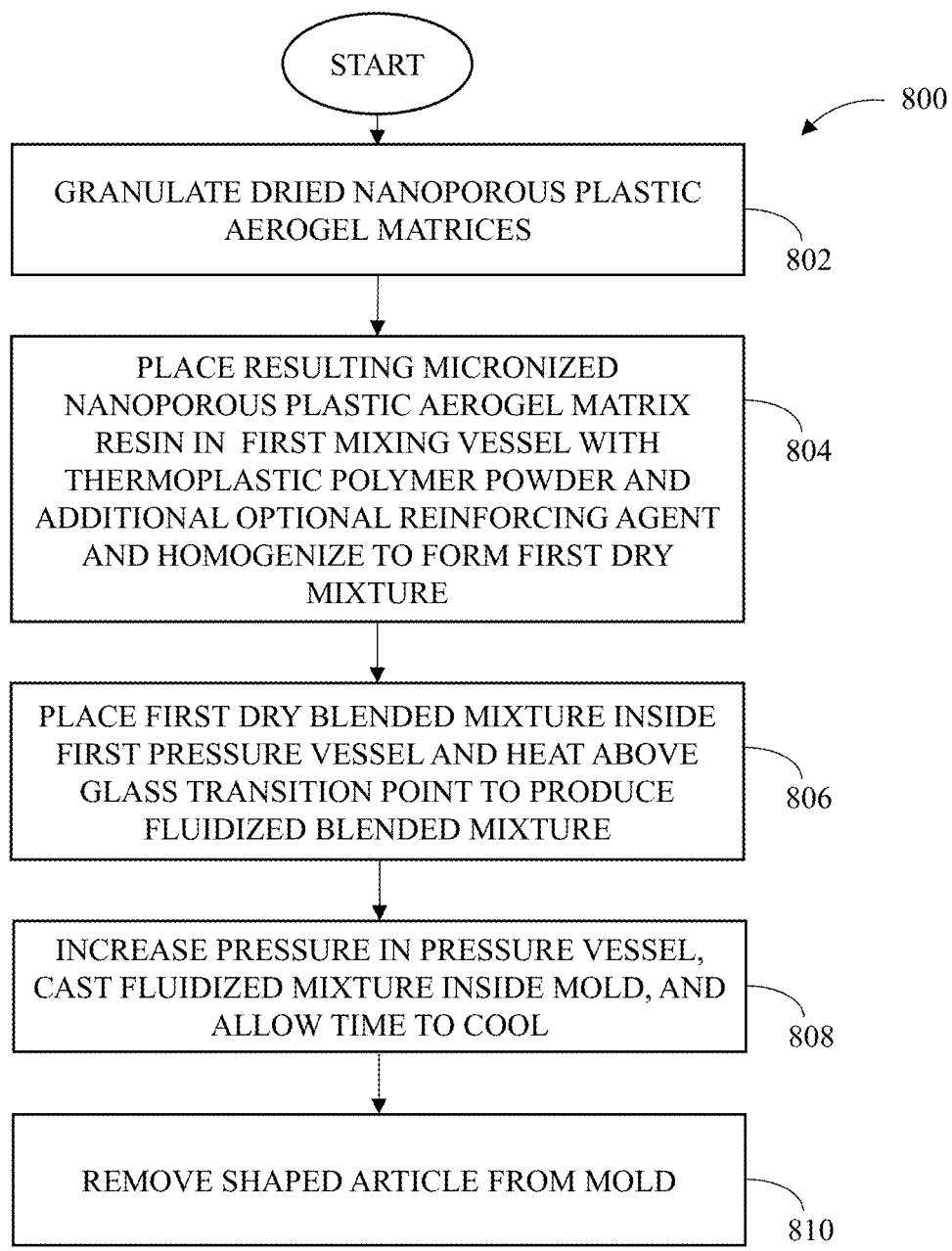
FIG. 8 shows a method of producing a blended plastic matrix reinforced aerogel structure.

The composite structure produced by the method 700 can further be used as a precursor to the production of the metal form produced as discussed above. The composite structure is then a metal form with an aerogel having an aerogel matrix and aerogel pores dispersed throughout the aerogel. In some embodiments, the pores could be nanoporous. In some embodiments, the aerogel matrix is impregnated with a thermoplastic. In some embodiments the pores of the aerogel matrix are less than 10 nanometers in size. In some embodiments, the impregnated thermoplastic includes a thermoplastic matrix having thermoplastic pores dispersed throughout the thermoplastic matrix, with the thermoplastic pores that are nano-porous. In some embodiments, the thermoplastic has pores that are less than 10 nanometers in size. In some embodiments, the aerogel structure is at least 20% by weight of the composite structure. In some embodiments, the thermoplastic portion is crystalline. In some embodiments, the thermoplastic portion is semi-crystalline. In some embodiments, the thermoplastic portion is amorphous. In some embodiments, the composite structure includes graphene. In some embodiments, the composite structure contains filler material. In some embodiments, the filler material contains graphene. In some embodiments, the composite structure contains reinforcing agents FIG. 8 shows a method 800 of producing a blended plastic matrix reinforced aerogel structure. In step 802 of method 800 dried nanoporous plastic aerogel matrices are granulated to produce a micronized nanoporous plastic aerogel matrices powdered resin. Granulation may be accomplished by physical micronization techniques such as but not limited to crushing, milling, agitation, mechanical sieving or a combination there for of.

In step 804 of method 800 Dried micronized nanoporous plastic aerogel matrices resin is then placed in a first mixing vessel with at least one thermoplastic polymer powder and an additional optional reinforcing agent and homogenized at a temperature below the glass transition point of at least one of the thermoplastic polymer powders to form a first dry mixture. Additional reinforcing agent can be: fibers, particles, matrices, foam, mesh crosslinking polymers, two-dimensional materials, few-layer materials often called two-dimensional materials, or nanotubes and can be composed of an aerogel, a zeolite, carbon, a polymer, a glass, crystals, bimetallic glasses, a metal, inorganic elements, functional moieties, or a combination thereof.

In step 806 of method 800, the first dry blended mixture is then placed inside of first pressure vessel and heated above the glass transition point of a preponderance of the preponderance of the glass transition point of the thermoplastic polymer powder(s) contained within the first dry blended mixture inside of a vessel for a period of time sufficient to produce a fluidized blended mixture. In some embodiments the first pressure vessel may be the first mixing vessel.

In step 808 of method 800, subsequent to sufficient fluidization, the pressure inside said pressure vessel is increased and the fluidized mixture is cast inside of a mold into any desired usable shape or form through melt-spinning, extruded into tapes, injection molded, blow molded, and/or compression molded. The molten shaped article is allowed to cool to a substantially solidified state.

In step 810 of method 800, subsequent to sufficient solidification the shaped article is removed from said mold, producing a shaped thermoplastic polymer article containing nanoporous plastic aerogel matrices with or without additional reinforcing agent(s).

In some embodiments, shaped articles are produced through incorporation of additional processed during the casting phases such as vulcanization, inverse vulcanization; or a combination therefore of.

In some embodiments the weight ratio of micronized nanoporous plastic aerogel matrices powdered resin to thermoplastic polymer powder in said dry blended mixture is less than about 20:100. Preferably in some embodiments, the weight ratio of micronized nanoporous plastic aerogel matrices powdered resin to thermoplastic polymer powder in said dry blended mixture is greater than about 25:100. In preferred embodiments, the weight ratio of micronized nanoporous plastic aerogel matrices powdered resin to thermoplastic polymer powder in said dry blended mixture is greater than about 21:100 and less than about 95:5.

In some embodiments the weight ratio of additional reinforcing material in said dry blended mixture is greater than about 0.1 wt %. In some embodiments the weight ratio of additional reinforcing material in said dry blended mixture is less than about 80 wt %. In preferred embodiments the weight ratio of additional reinforcing material in said dry blended mixture is greater than about 0.25 wt % and less than 30 wt %.

Figure 9A:
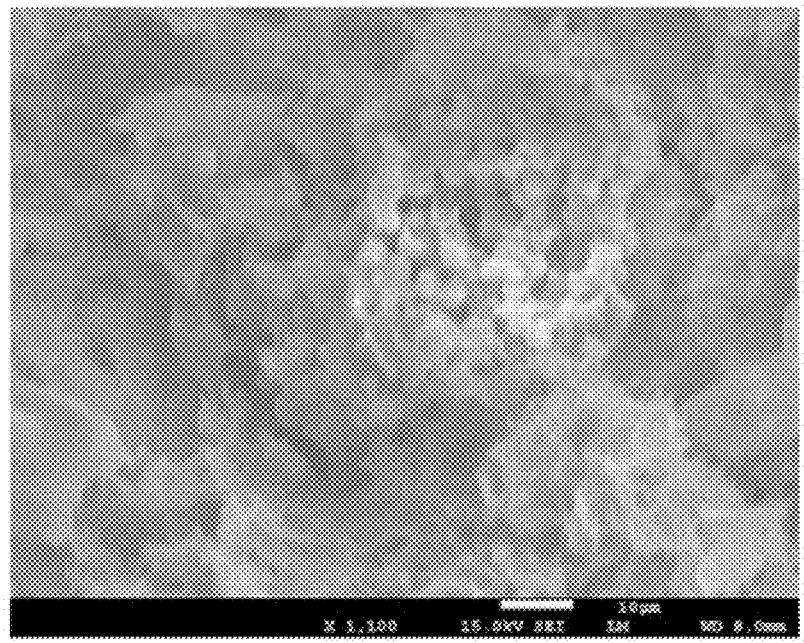
FIG. 9a shows a scanning electron microscope image of aerogel microparticles dispersed within an aerogel matrix, as produced by the methods discussed in this disclosure.
Figure 9B:
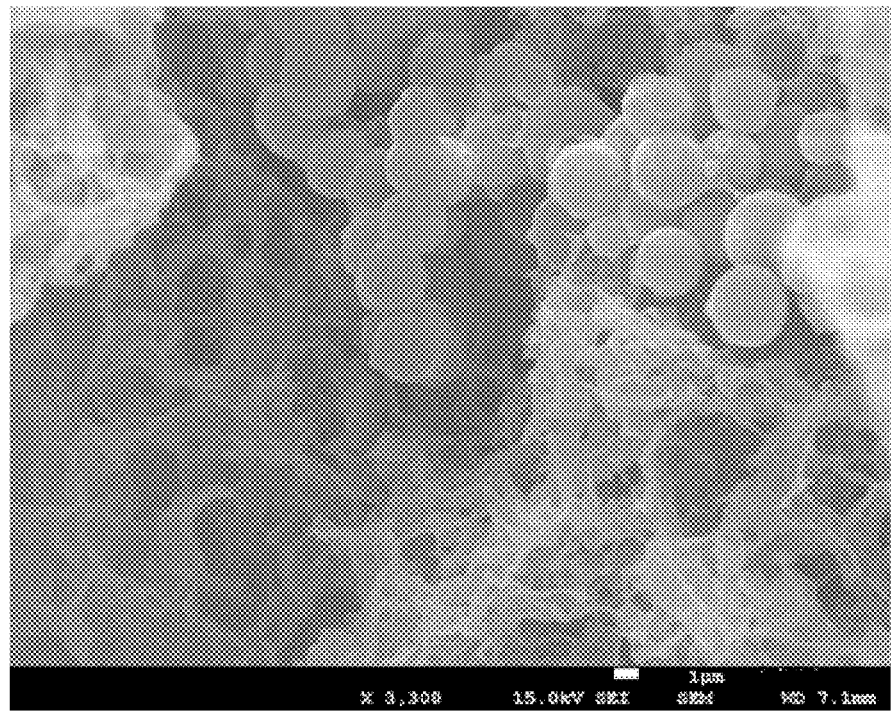
FIG. 9b shows an additional scanning electron microscope image of aerogel microparticles dispersed within an aerogel matrix, as produced by the methods discussed in this disclosure.
Figure 10A:
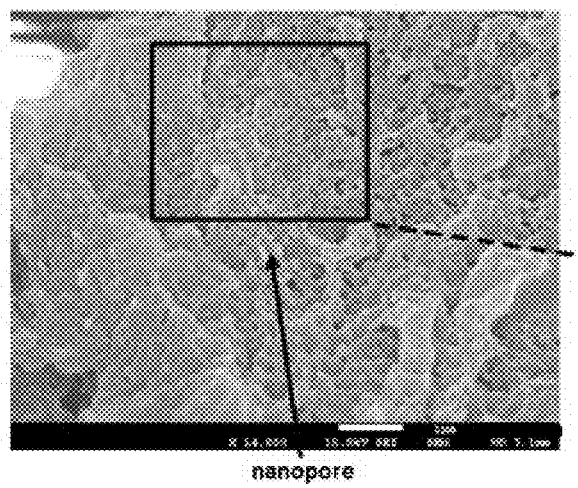
FIG. 10a shows a scanning electron microscope image of the composite showing nanopores measured to be approximately 10 nm or less.
Figure 10B:
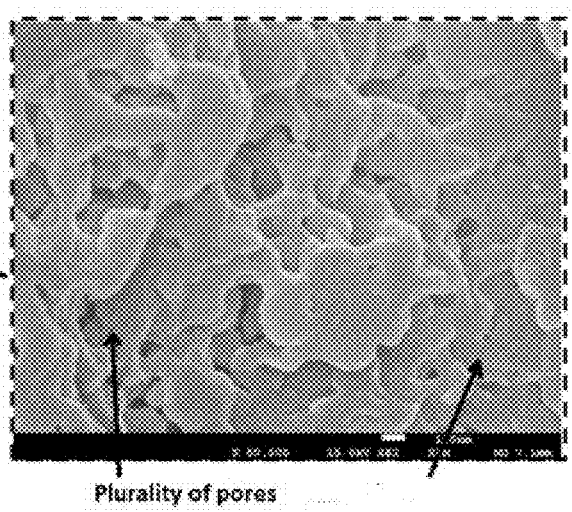
Figure 11:
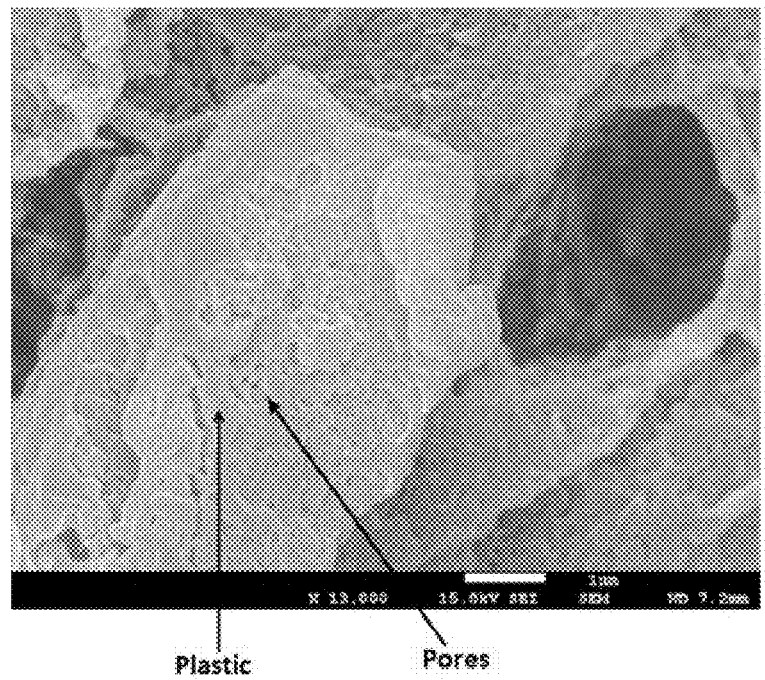
FIG. 11 shows a scanning electron microscope image showing a plurality of nanopores within the thermoplastic portion of an aerogel-plastic composite, wherein the scale is an approximate scale, as produced by the methods discussed in this disclosure.

FIGS. 9-11 show SEM images of an aerogel-thermoplastic composite as produced by the methods of this disclosure. FIG. 9a shows a scanning electron microscope image of aerogel microparticles dispersed within an aerogel matrix, as produced by the methods discussed in this disclosure. FIG. 9b shows an additional scanning electron microscope image of aerogel microparticles dispersed within an aerogel matrix, as produced by the methods discussed in this disclosure. FIG. 10 shows a scanning electron microscope image showing a plurality of nanopores smaller than 10 nm within an aerogel-plastic composite, as produced by the methods discussed in this disclosure. FIG. 11 shows a scanning electron microscope image showing a plurality of nanopores within the thermoplastic portion of an aerogel-plastic composite, as produced by the methods discussed in this disclosure.

The following describes an example for making aerogel microparticles and three exemplary options for mixing the aerogel microparticles with plastic material and processing the mixture to a final product. The example and the options described below are not intended to limit the scope of the application, as they are merely examples.

To make aerogel microparticles, 5 mL of methyltrimethoxysilane (MTMS), 0.05 g of hexadecyl trimethyl ammonium bromide (CTAB), and 15 mL of deionized water are mixed for twenty minutes under vigorous stirring until the solution is homogenous. Thereafter, ammonium hydroxide is added to the mixture and stirring is continued for several minutes using, for example, a stirring rate of 1000 rpm/minute. At a stirring rate of 1000 rpm/minute, the sol (aqueous phase) was poured into hexane (oil phase) at a volume ratio of 0.3 to form a water-in-oil (W/O) emulsion. Subsequently, droplets of the dispersed phase are formed under continuous stirring. After approximately 10 minutes, gelation of the dispersed phase took place, and stirring was stopped because the emulsion converted into a dispersion of spherical gel particles in the oil phase. Next, filtration and washing with acetonitrile were performed to isolate the gel microspheres from the emulsion system, as well as to remove the residual surfactant and chemicals.

In Option 1, the plastic material, in a container that is separate from the aerogel microparticles, 4 grams of polylactic acid (PLA) filament was dissolved in 50 mL of acetonitrile. The aerogel microparticles were then added to the mixture of the dissolved PLA/acetonitrile and mixed via ultrasonication, mechanical stirring, or high-shear mixing. Additionally (and optionally), 4 mg of graphene oxide nanoplates are added and dispersed via ultrasonication. After the mixture is homogenized, the suspension of aerogel microparticles, PLA, and graphene oxide are cast into a mold of a desired shape. Subsequent to casting, the mixture was rapidly frozen while still in the mold. After freezing the molded mixture is taken out of the mold while still frozen and placed into a dry ice/acetone bath, where the temperature of the bath is kept below the freezing point of acetonitrile, i.e., kept below approximately −45° C.). Acetone is miscible with acetonitrile and will dissolve the solid acetonitrile and eventually replace it. PLA, however, is insoluble in acetone and thus the shape of the mold is retained after acetonitrile is replaced by the acetone. Samples were then placed in a custom drying vessel, such as a vessel described herein, where liquid or supercritical carbon dioxide is used to replace the acetone in the molded mixture shortly before the molded mixture is frozen and sublimed as described in U.S. Patent Application Ser. No. 2018/0274856. The preferred thickness for the samples is greater than 4 mm.

In Option 2, in a container that is separate from the aerogel microparticles, 4 grams of PLA filament are dissolved in 50 mL of dichloromethane. After being thoroughly washed in acetonitrile, the aerogel particles in the first container were diluted in 20 mL of acetonitrile and added to the mixture of dissolved PLA/dichloromethane and mixed via ultrasonication, mechanical stirring, or high-shear mixing. Additionally, 4 mg of graphene oxide nanoplates were dispersed therein via ultrasonication. After the mixture has homogenized, the suspension of aerogel microparticles, the PLA and the graphene oxide are cast into a mold of a desired shape. After being cast into the mold, the molded mixture is solidified by raising the temperature to slowly evaporate some of the dichloromethane, which has a lower boiling point than acetonitrile. Once solidified, the molded mixture is placed in a bath of pure acetone. Acetone is used because PLA is forced to precipitate. Once the acetone has replaced the acetonitrile/dichloromethane, the molded mixture is placed in the custom drying vessel described, such as a vessel described herein, where liquid or supercritical carbon dioxide is used to replace the acetone in and around the molded mixture. Thereafter, the molded mixture is frozen and sublimed as set forth in U.S. Patent Application Ser. No. 2018/0274856.

In Option 3, 4 grams of PLA are dissolved in 50 mL of acetonitrile in a container that is separate from the aerogel microparticles. After being thoroughly washed in the acetonitrile, the aerogel microparticles described above are added to the container of the dissolved PLA in acetonitrile and mixed via ultrasonication, mechanical stirring, or high shear mixing. Additionally, 4 mg of graphene oxide nanoplates in 5 mL of a soluble solvent such as acetonitrile are dispersed into the container of the dissolved PLA and aerogel microparticles and dispersed via ultrasonication. The combined mixture is cast into a desired mold and heated to remove enough acetonitrile to cause solidification of the molded mixture. Once solidified, the molded mixture is placed in a bath of pure acetone. After replacing acetonitrile that is in and around the solidified molded mixture with acetone, the molded mixture is placed in a custom drying vessel and liquid or supercritical carbon dioxide is used to replace the acetone. Thereafter, the molded mixture and the liquid or supercritical carbon dioxide are frozen and sublimed, as set forth in U.S. Patent Application Ser. No. 2018/0274856.

In Option 4, the plastic material, in a container that is separate from the aerogel microparticles, 8 grams of polystyrene (PS) was dissolved in 50 mL of acetone. The aerogel microparticles were then added to the mixture of the dissolved PS/acetone and mixed via ultrasonication, mechanical stirring, or high-shear mixing at a temperature of approximately 55° C. Additionally (and optionally), 4 mg of graphene oxide nanoplates are added and dispersed via ultrasonication. After the mixture is homogenized, the suspension of aerogel microparticles, PS, and graphene oxide are cast into a mold of a desired shape. Subsequent to casting, the mixture was rapidly solidified while still in the mold. After solidification the molded mixture is taken out of the mold while still solid and placed into a methanol bath. Resulting bath was drained and fresh methanol was added 4 times. Samples were then placed in a custom drying vessel, such as a vessel described herein, where liquid or supercritical carbon dioxide is used to replace the acetone or methanol in the molded mixture shortly before the molded mixture is frozen and sublimed as described in U.S. Patent Application Ser. No. 2018/0274856.

Alternatively, samples can be dried via direct evaporation of methanol from samples at ambient pressure at 25° C. for 12 hours and 90° C. for another 6 hours to remove the residual solvents.

In Option 5, 49.5 grams 200 mesh dried nanoporous plastic aerogel matrices from option 1, 0.4 grams of multi-wall carbon nanotubes, and 150 grams of PLA resin were dry-blended with one another, and the mixture was melted and mixed in a biaxial kneading extruder at 200° C. for an average time period of 4 minutes and was extruded from a mouthpiece into strands. The strands were then cooled and cut into pellets.

After drying each of the molded mixtures as set forth in Options 1-3, the molded mixture may be utilized as is or may be refined further and added to other plastic materials at desired concentrations and utilized as a filler material.

In option 6, one cylindrical non reinforced approximately 1.33 cm diameter×2.3 cm long and one cylindrical graphene oxide reinforced approximately 1.05 cm diameter×3.4 cm long shaped plastic aerogel composites from option 1 were place in a refractory mold along with 2 non aerogel PLA foam samples of corresponding samples respectively. Refractory sand was placed around the 4 samples and cured for a sufficient amount of time. After curing, molten aluminum was introduced into the refractory encased samples and the plastic portion was vaporized and vented. The molten metal was then allowed to cool, and the samples were removed. The cooled samples were separated from the base stem. The plastic aerogel composite samples from option one respectively maintained their original shapes yield a non-reinforced sample of 1.3 cm diameter×2.2 cm long and a graphene oxide reinforced sample of 1.0 cm diameter×3.3 cm. The corresponding non aerogel PLA foam samples collapsed during pouring.

Obviously, many modifications and variations of the present disclosure are possible in light of the above teachings and may be practiced otherwise than as specifically described while within the scope of the appended claims. These antecedent recitations should be interpreted to cover any combination in which the inventive novelty exercises its utility.

What is claimed is:

1. A composite structure comprising,
    a metal form including:
        an aerogel matrix formed of an aerogel, wherein the aerogel matrix is nanoporous and includes a plurality of aerogel pores, a polymer occupies at least a portion of the aerogel pores of the aerogel matrix, the polymer is a thermoplastic, and the thermoplastic is nanoporous and includes a plurality of thermoplastic pores.

2. The composite structure of claim 1, wherein the metal in the metal form is selected from a group consisting of aluminum, bronze, copper, iron, steel, magnesium, and zinc.

3. The composite structure of claim 1, wherein the thickness of the metal form is less than 25 mm.

4. The composite structure of claim 1, wherein the polymer is selected from a group consisting of polystyrene, expandable styrene, or (methyl methacrylate) MMA copolymer.

5. The composite structure of claim 1, wherein the thermoplastic pores are less than 10 nanometers in size.

6. The composite structure of claim 1, wherein the thermoplastic is crystalline.

7. The composite structure of claim 1, wherein the thermoplastic is semi-crystalline.

8. The composite structure of claim 1, wherein the thermoplastic is amorphous.

9. The composite structure of claim 1, wherein the aerogel comprises at least 20% by weight of the composite structure.

10. The composite structure of claim 1, wherein the aerogel pores are less than 10 nanometers in size.

11. The composite structure of claim 1, wherein the composite structure further contains filler material.

12. The composite structure of claim 11, wherein the filler material is selected from a group consisting of graphene oxide, boron nitride, molybdenum disulfide, and tungsten disulfide.

13. The composite structure of claim 1, wherein the composite structure further contains reinforcing agents.

14. The composite structure of claim 1, wherein the polymer includes at least one of a acrylonitrile-butadiene-styrene (ABS), epoxy, melamine formaldehyde (MF), polyacrylonitrile (PAN), polyamide (PA), pylon, polyimide (PI), polybutadiene (PBD), polybutylene (PB), polycarbonate (PC), polyester, polyetheretherketone (PEEK), polyetherimide (PEI), polyethersulfone (PES), polyethylene (PE), polymethylpentene (PMP), polyphenylene Oxide (PPO), polyphenylene sulfide (PPS), polypropylene (PP), polystyrene (PS), polysulfone (PSU), polyurethane (PU), polyvinylchloride (PVC), polyvinylidene chloride (PVDC), silicone (SI), methyl methacrylate (MMA) copolymer, polymethylacryate, polymethyl methacrylate, polycyclopentadiene, poly(paraphenlene terephthalamide), cellulose, and polytetrafluoroethylene (PTFE).

15. The composite structure of claim 11, wherein the filler material includes at least one of Graphene and Graphene oxide.

* * * * *